(12) United States Patent
Okuyama et al.

(10) Patent No.: US 12,099,270 B2
(45) Date of Patent: Sep. 24, 2024

(54) DISPLAY DEVICE

(71) Applicant: Japan Display Inc., Tokyo (JP)

(72) Inventors: Kentaro Okuyama, Tokyo (JP); Akira Sakaigawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/538,101

(22) Filed: Dec. 13, 2023

(65) Prior Publication Data

US 2024/0111182 A1 Apr. 4, 2024

Related U.S. Application Data

(60) Continuation of application No. 18/083,795, filed on Dec. 19, 2022, now Pat. No. 11,867,995, which is a (Continued)

(30) Foreign Application Priority Data

Oct. 22, 2014 (JP) .................. 2014-215051

(51) Int. Cl.
*G02F 1/1334* (2006.01)
*G02F 1/1335* (2006.01)
(Continued)

(52) U.S. Cl.
CPC ...... *G02F 1/1334* (2013.01); *G02F 1/133615* (2013.01); *G02F 1/133622* (2021.01); *G02F 1/133638* (2021.01)

(58) Field of Classification Search
None
See application file for complete search history.

(56) References Cited

U.S. PATENT DOCUMENTS

| 8,237,888 B2 | 8/2012 | Okuyama et al. |
| 8,330,709 B2 | 12/2012 | Uchida et al. |

(Continued)

FOREIGN PATENT DOCUMENTS

| CN | 101281317 | 10/2008 |
| CN | 102713410 | 10/2012 |

(Continued)

OTHER PUBLICATIONS

Korean Office Action mailed Aug. 18, 2016 in Korean application No. 10-2015-0146734 (19 pages).

(Continued)

*Primary Examiner* — Stephen T. Reed
(74) *Attorney, Agent, or Firm* — K&L Gates LLP

(57) ABSTRACT

A display device is provided and includes display panel including first substrate, lower electrode on first substrate, lower alignment layer with first alignment direction on lower electrode, second substrate, upper electrode on second substrate, upper alignment layer with first alignment direction on upper electrode, and liquid crystalline polymers with striped structure and liquid crystal molecules which are aligned in first alignment direction, and which are disposed between first and second substrates; light source unit disposed at side of display panel and configured to emit incident light which is not polarized; and light guided structure disposed between side of display panel and light source unit, wherein light source unit is disposed in parallel to first alignment direction and light which is emitted from display panel is polarized in first alignment direction.

5 Claims, 23 Drawing Sheets

Related U.S. Application Data continuation of application No. 17/527,781, filed on Nov. 16, 2021, now Pat. No. 11,531,226, which is a continuation of application No. 16/783,379, filed on Feb. 6, 2020, now Pat. No. 11,181,766, which is a continuation of application No. 16/297,168, filed on Mar. 8, 2019, now Pat. No. 10,564,465, which is a division of application No. 14/883,834, filed on Oct. 15, 2015, now Pat. No. 10,268,062.

(51) Int. Cl.
*G02F 1/13357* (2006.01)
*G02F 1/13363* (2006.01)

(56) References Cited

U.S. PATENT DOCUMENTS

| | | | |
|---|---|---|---|
| 11,181,766 B2* | 11/2021 | Okuyama | G02F 1/133615 |
| 11,531,226 B2 | 12/2022 | Okuyama et al. | |
| 2008/0239198 A1 | 10/2008 | Kim et al. | |
| 2010/0060825 A1 | 3/2010 | Jang et al. | |
| 2010/0165450 A1 | 7/2010 | Okuyama et al. | |
| 2010/0177025 A1* | 7/2010 | Nagata | G02B 27/0101 345/76 |
| 2011/0141551 A1 | 6/2011 | Uchida et al. | |
| 2011/0169877 A1 | 7/2011 | Ishida | |
| 2011/0242146 A1 | 10/2011 | Uchida et al. | |
| 2011/0249221 A1* | 10/2011 | Uchida | G02F 1/133615 362/606 |
| 2012/0274867 A1 | 11/2012 | Shinkai et al. | |
| 2013/0002984 A1 | 1/2013 | Uchida et al. | |
| 2013/0229595 A1 | 9/2013 | Shinkai et al. | |
| 2013/0258711 A1 | 10/2013 | Okuyama et al. | |
| 2014/0036176 A1 | 2/2014 | Shinkai et al. | |
| 2014/0232728 A1 | 8/2014 | Eakin | |
| 2015/0109763 A1 | 4/2015 | Shinkai et al. | |
| 2015/0293402 A1 | 10/2015 | Shinkai et al. | |
| 2016/0163271 A1 | 6/2016 | Sakaigawa et al. | |
| 2017/0031187 A1 | 2/2017 | Douyou | |

FOREIGN PATENT DOCUMENTS

| | | |
|---|---|---|
| CN | 103502882 | 1/2014 |
| JP | 10186361 | 7/1998 |
| JP | 2006-317712 A | 11/2006 |
| JP | 2011221196 | 11/2011 |
| JP | 2012-141588 A | 7/2012 |
| JP | 2012-151081 A | 8/2012 |
| JP | 2012-252993 A | 12/2012 |
| JP | 2014044229 | 3/2014 |
| KR | 10-2008-0089743 A | 10/2008 |
| KR | 10-2010-0029633 A | 3/2010 |
| TW | 201407196 A | 2/2014 |
| TW | 201439609 A | 10/2014 |
| WO | 2010035562 A1 | 4/2010 |
| WO | 2014024688 A1 | 2/2014 |

OTHER PUBLICATIONS

Korean Office Action mailed Jan. 31, 2017 in Korean application No. 10-2015-0146734 (17 pages).
Taiwanese Office Action mailed Feb. 9, 2017 in Taiwanese application No. 104133087 (15 pages).
Korean Office Action mailed Jul. 12, 2017 in Korean application No. 10-2015-0146734.
Chinese Office Action mailed Apr. 18, 2018 in Chinese application No. 201510689670.3.
Japanese Office Action issued Jul. 23, 2019 in corresponding Japanese Application No. 2015-200143.

* cited by examiner

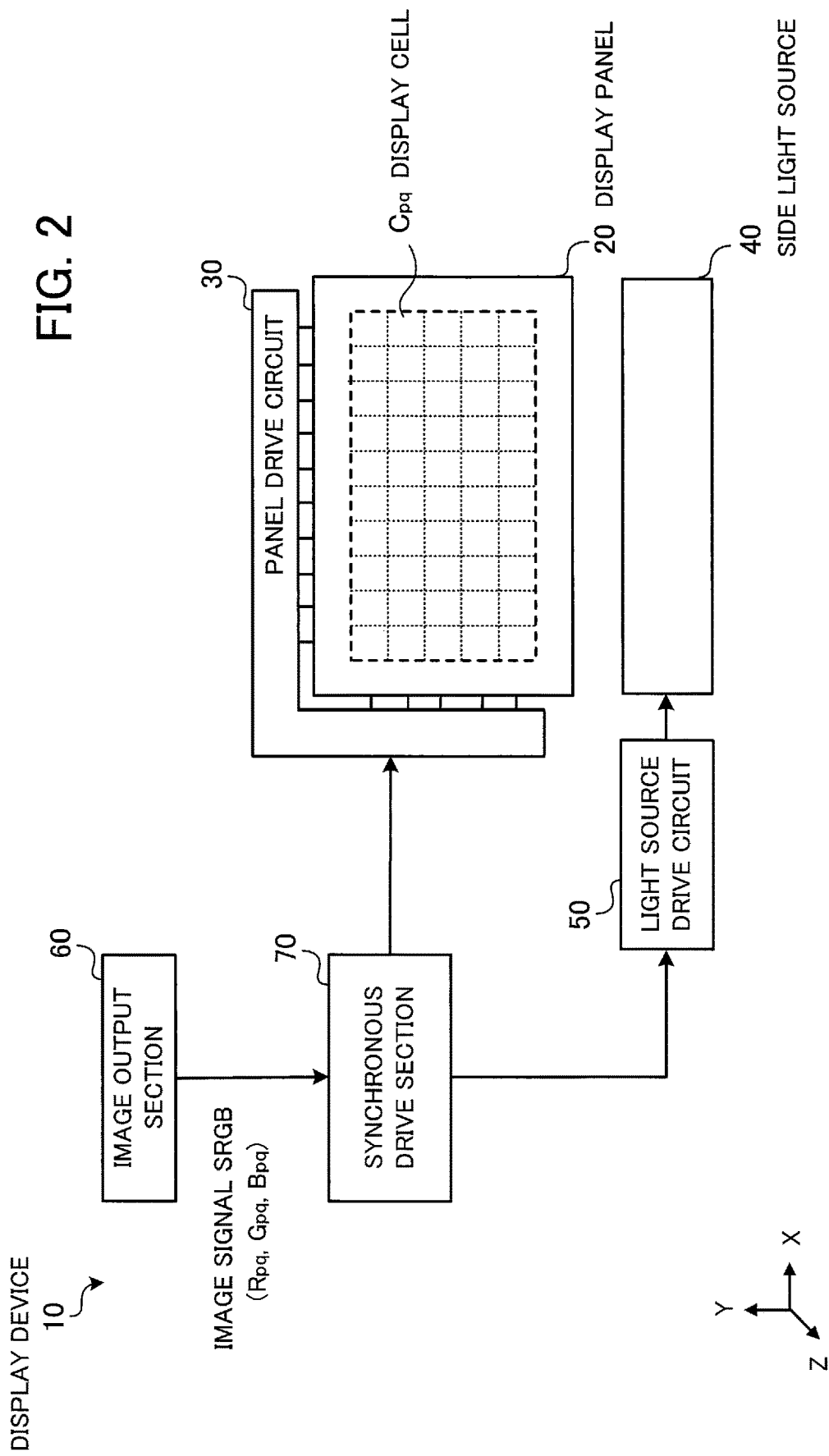

SECTION OF DISPLAY PANEL

VOLTAGE NOT APPLIED

VOLTAGE APPLIED

FIG. 13
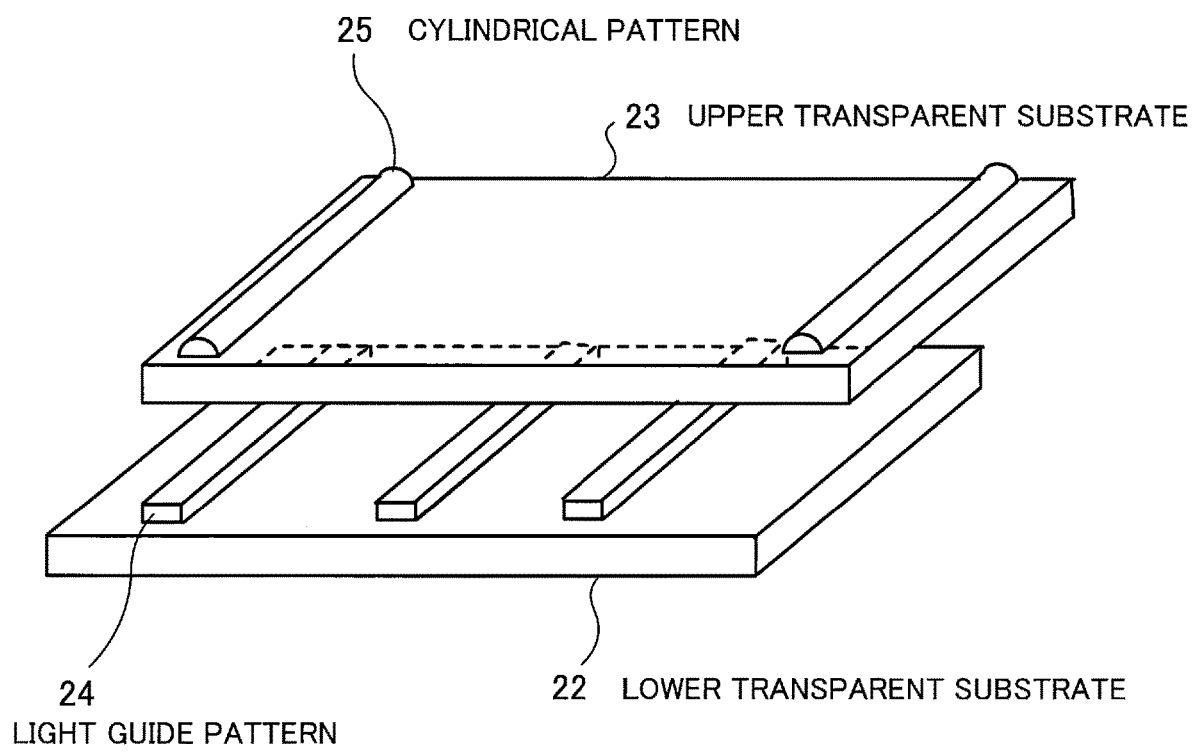
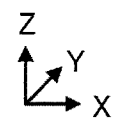

AMOUNT OF EMITTED LIGHT POLARIZED IN DIRECTION WHICH MATCHES DIRECTION OF STRIPES

AMOUNT OF EMITTED LIGHT POLARIZED IN DIRECTION PERPENDICULAR TO DIRECTION OF STRIPES

DISPLAY DEVICE

CROSS REFERENCES TO RELATED APPLICATIONS

The present application is a continuation of U.S. application Ser. No. 18/083,795, filed on Dec. 19, 2022, which is a continuation of U.S. application Ser. No. 17/527,781, filed on Nov. 16, 2021, issued as U.S. Pat. No. 11,531,226 on Dec. 20, 2022, which is a continuation of U.S. application Ser. No. 16/783,379, filed on Feb. 6, 2020, issued as U.S. Pat. No. 11,181,766 on Nov. 23, 2021, which application is a continuation of U.S. application Ser. No. 16/297,168, filed on Mar. 8, 2019, which application is a division of U.S. application Ser. No. 14/883,834, filed on Oct. 15, 2015, which application claims priority to Japanese Priority Patent Application JP 2014-215051 filed in the Japan Patent Office on Oct. 22, 2014, the entire content of which is hereby incorporated by reference.

BACKGROUND

The embodiments discussed herein are related to a display device.

In recent years display devices or lighting devices using polymer dispersed liquid crystal (PDLC) have been proposed. With such display devices or lighting devices voltage applied to PDLC is controlled to perform switching between a transparent state and a scattering state.

Ordinary normal PDLC is in a scattering state at the time of applied voltage being off and is in a transparent state at the time of applied voltage being on. Furthermore, reverse PDLC which is in a transparent state at the time of applied voltage being off and which is in a scattering state at the time of applied voltage being on is known.

Japanese Laid-open Patent Publication No. 2012-151081
Japanese Laid-open Patent Publication No. 2012-141588

SUMMARY

There is provided a display device which gives a feeling of high transparency.

According to an aspect, there is provided a display device including a light modulation layer disposed between a pair of transparent substrates, the light modulation layer having determined refractive index anisotropy and including plural light modulation elements, wherein the plural light modulation elements differ in responsiveness to an electric field generated by electrodes formed on a transparent substrate, and a light source which emits light of a determined color incident on the light modulation layer from a side of the light modulation layer. The light modulation layer transmits the incident light emitted from the light source when the electric field is not generated, and the light modulation layer scatters the incident light and emits scattered light to a transparent substrate when the electric field is generated.

The object and advantages of the invention will be realized and attained by means of the elements and combinations particularly pointed out in the claims.

It is to be understood that both the foregoing general description and the following detailed description are exemplary and explanatory and are not restrictive of the invention.

Additional features and advantages are described herein, and will be apparent from the following Detailed Description and the figures.

BRIEF DESCRIPTION OF THE FIGURES

FIG. 2 illustrates an example of the structure of a display device according to a second embodiment;

FIG. 13 illustrates another example of a structure in the second embodiment in which the straightness of incident light is enhanced;

DETAILED DESCRIPTION

Figure 1A:
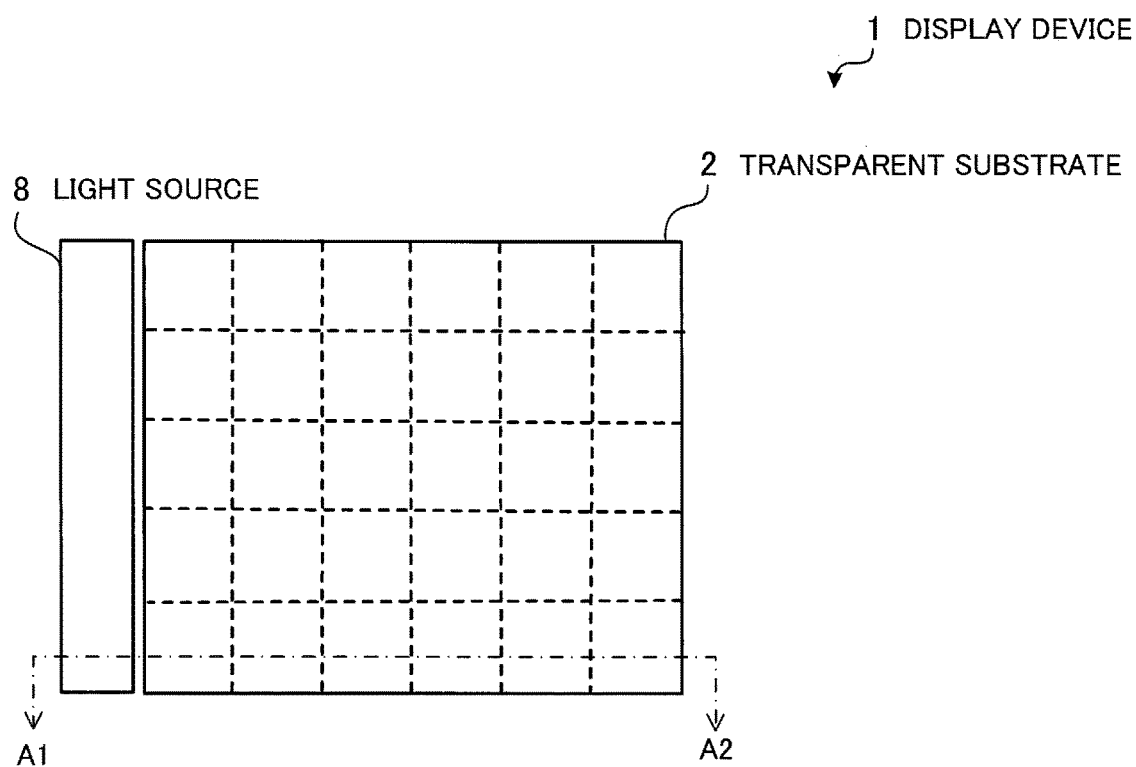
FIGS. 1A and 1B illustrate an example of the structure of a display device according to a first embodiment.

Embodiments will now be described with reference to the accompanying drawings, wherein like reference numerals refer to like elements throughout.

Disclosed embodiments are simple examples. It is a matter of course that a proper change which suits the spirit of the invention and which will readily occur to those skilled in the art falls within the scope of the present invention. Furthermore, in order to make description clearer, the width, thickness, shape, or the like of each component may schematically be illustrated in the drawings compared with the real state. However, it is a simple example and the interpretation of the present invention is not restricted.

In addition, in the present invention and the drawings the same components that have already been described in previous drawings are marked with the same numerals and detailed descriptions of them may be omitted according to circumstances.

First Embodiment

Figure 1B:
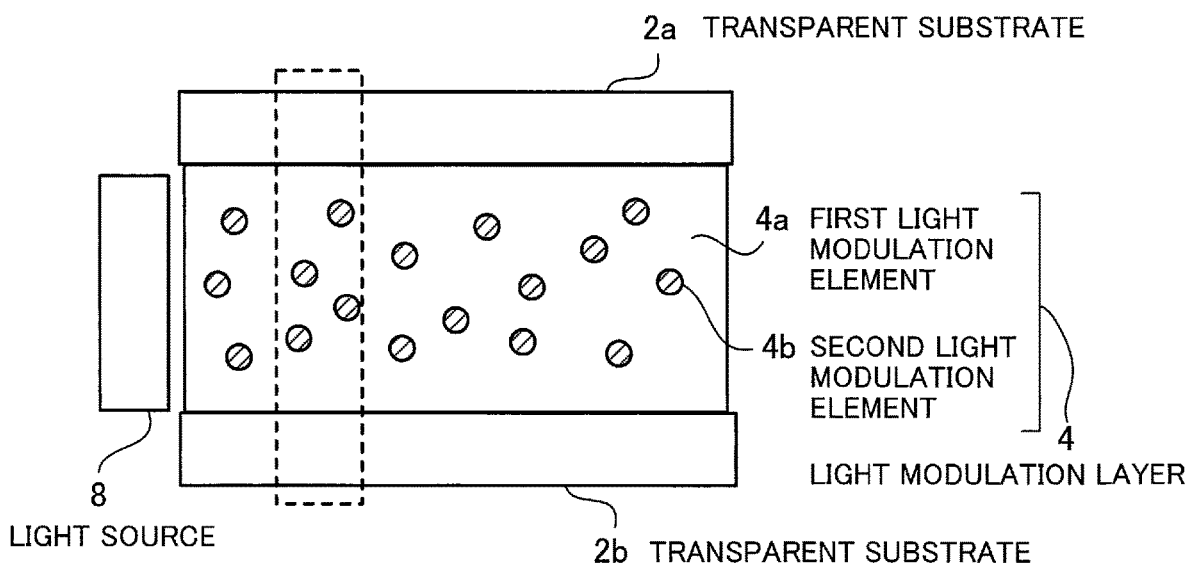

A display device according to a first embodiment will be described by the use of FIGS. 1A and 1B. FIGS. 1A and 1B illustrate an example of the structure of a display device according to a first embodiment. FIG. 1A is a plan view of a display device according to a first embodiment. FIG. 1B is a sectional view of the display device taken along lines A1-A2 of FIG. 1A. FIGS. 1A and 1B schematically illustrate a display device, so the dimensions and shapes may not be the same as actual dimensions and shapes.

As illustrated in FIG. 1A, with a display device 1 according to a first embodiment an outer surface of a transparent substrate 2 is open, so an observer visually recognizes the plane of the transparent substrate 2. Furthermore, a light source 8 is disposed along a side of the plane of the transparent substrate 2. A plane of a light modulation layer 4 is formed under the outer surface of the transparent substrate 2. A planar area in which the light modulation layer 4 is formed is a display area.

The structure of the display device 1 will be described. As illustrated in FIG. 1B, the transparent substrate 2 includes a pair of transparent substrates 2a and 2b disposed apart from each other. The light modulation layer 4 is formed between the transparent substrates 2a and 2b. Outer surfaces of the transparent substrates 2a and 2b on the opposite sides of the light modulation layer 4 are open. In addition, light emitted from the light source 8 enters the light modulation layer 4 from the side.

The light modulation layer 4 includes a first light modulation element 4a and a second light modulation element 4b each of which has determined refractive index anisotropy. The first light modulation element 4a and the second light modulation element 4b differ in responsiveness to an electric field generated by electrodes formed on the transparent substrates 2a and 2b. For example, the responsiveness of the second light modulation element 4b to an electric field is relatively high compared with the responsiveness of the first light modulation element 4a to an electric field.

With the above light modulation layer 4 there is little difference in refractive index between the first light modulation element 4a and the second light modulation element 4b in all directions including a front direction and an oblique direction when an electric field is not generated in the light modulation layer 4. Accordingly, incident light, which is emitted from the light source 8 and enters the light modulation layer 4 from the side, passes through the light modulation layer 4, and, is not emitted to the transparent substrate 2a or 2b side. Furthermore, when a piercing direction is defined as a direction in which a layer including the transparent substrate 2a, the light modulation layer 4, and the transparent substrate 2b is pierced, light which travels in the piecing direction passes through the layer including the transparent substrate 2a, the light modulation layer 4, and the transparent substrate 2b. That is to say, when an electric field is not generated in the light modulation layer 4, the light modulation layer 4 has high transparency. If the plane of the transparent substrate 2a is considered as a front, then light which enters the transparent substrate 2b corresponding to a back from the outside is visually recognized by an observer. In the following description a state in which the light modulation layer 4 transmits incident light will be referred to as a "transparent state". The front direction refers to a direction from which the plane of the transparent substrate 2 is visually recognized, and the oblique direction refers to any direction other than the front direction.

On the other hand, when an electric field is generated in the light modulation layer 4, there is a great difference in refractive index between the first light modulation element 4a and the second light modulation element 4b in all directions. This difference in refractive index corresponds to the difference in responsiveness between the first light modulation element 4a and the second light modulation element 4b. As a result, incident light emitted from the light source 8 is scattered in the light modulation layer 4 and scattered light is emitted to the transparent substrate 2a side and the transparent substrate 2b side. Therefore, the scattered light emitted from the transparent substrate 2a is visually recognized by the observer. In the following description a state in which the light modulation layer 4 scatters incident light will be referred to as a "scattering state".

According to the above display device 1, switching between the transparent state and the scattering state of the light modulation layer 4 can be performed by controlling application of voltage to electrodes by which an electric field is generated in the light modulation layer 4 and performing switching between the generation and extinction of an electric field in the light modulation layer 4.

There is little difference in refractive index between the first light modulation element 4a and the second light modulation element 4b in all directions in a state in which an electric field is not generated in the light modulation layer 4. Thus, the display device 1 has high transparency from any direction. Ordinary normal PDLC has transparency in the front direction. However, ordinary normal PDLC has, in principle, a scattering property in an oblique direction, so it gives a feeling of low transparency. On the other hand, the display device 1 has high transparency in all directions. In the above description the transparent substrate 2a is considered as the front. However, the same applies to a case where the transparent substrate 2b is considered as the front.

Furthermore, as indicated by chain lines in FIGS. 1A and 1, the display area of the display device 1 may be divided into areas and switching between the transparent state and the scattering state may be performed in each area after the division. By controlling the transparent state and the scattering state in this way in each area after the division, an image can be displayed. In the example of FIGS. 1A and 1B, the display area is divided like a matrix. However, another method may be adopted. For example, one electrode may be used for performing switching between the transparent state and the scattering state in the display area. In addition, electrodes may be formed only in part of the display area and switching between the generation and extinction of an electric field may be performed only in the part of the display area.

In addition, the display device 1 according to an embodiment has been described. However, the present disclosure is not limited to the foregoing. For example, the present disclosure is applicable to a lighting device which utilizes light emitted from the display device 1 as lighting. Furthermore, there is no need for the display device 1 to always perform display. For example, the transparent substrate 2 may be utilized as a transparent plate, such as a windowpane, in a normal state and an image may be displayed at need. The display device 1 has high transparency in a state in which voltage is not applied to electrodes, so such a use is possible.

Display devices which will now be described as embodiments are not mere display devices in a narrow sense but are applicable to various situations.

Second Embodiment

A display device according to a second embodiment will now be described. First the structure of a display device will be described.
(1) Structure
FIG. 2 illustrates an example of the structure of a display device according to a second embodiment.

A display device 10 illustrated in FIG. 2 includes a display panel 20, a panel drive circuit 30, a side light source 40, a light source drive circuit 50, an image output section 60, and a synchronous drive section 70. The display device 10 is an embodiment of the display device 1 illustrated in FIGS. 1A and 1B. For convenience, it is assumed that when the display panel 20 is viewed from the front direction, a horizontal direction, a vertical direction, and a depth direction are an X direction, a Y direction, and a Z direction respectively. These directions will be employed at need in the following description.

As illustrated in FIGS. 1A and 1, the display panel 20 includes the pair of transparent substrates 2 disposed apart from each other with the light modulation layer 4 therebetween. The outer surfaces of the pair of transparent substrates 2 opposite to the light modulation layer 4 side are open and light emitted from the light modulation layer 4 is visually recognized by an observer through the outer surfaces of the pair of transparent substrate 2. In the following description an area in which the observer can visually recognize color as a result of light emission by the light modulation layer 4 will be referred to as a display area. Display control of the display panel 20 is exercised according to display units which are parts obtained by dividing the display area. In the following description it is assumed that this display unit is a display cell Cpq. In the example of FIG. 2, display cells Cpq are arranged like a two-dimensional matrix. "p" indicates a position in the row direction and "q" indicates a position in the column direction.

The panel drive circuit 30 controls the application of voltage to electrodes which causes the generation or extinction of an electric field in a light modulation layer area corresponding to a display cell Cpq. On the basis of a drive signal inputted from the synchronous drive section 70, the panel drive circuit 30 applies voltage to electrodes in each display cell Cpq, drives display cells Cpq in order, and performs switching between the scattering state and the transparent state of a light modulation layer area corresponding to each display cell Cpq.

The side light source 40 is disposed along a side of the display panel 20 and emits light of a determined color to the light modulation layer 4 of the display panel 20. The side light source 40 emits lights of different colors and includes plural color light sources controlled independently of one another. For example, the side light source 40 includes a first color light source which emits light of a first primary color, a second color light source which emits light of a second primary color, and a third color light source which emits light of a third primary color. In the second embodiment it is assumed that the first primary color is red, that the second primary color is green, and that the third primary color is blue. Any color light sources which emit lights of complementary colors may be combined and used in place of the first color light source, the second color light source, and the third color light source which emit lights of the first primary color, the second primary color, and the third primary color respectively. Furthermore, the side light source 40 may emit monochromatic light.

The light source drive circuit 50 drives the color light sources of the side light source 40 individually on the basis of a drive signal from the synchronous drive section 70.

The image output section 60 outputs an image signal SRGB to the synchronous drive section 70. Color information corresponding to the display area of the display panel 20 is set in the image signal SRGB. For example, the image signal SRGB corresponds to a display cell Cpq and contains a signal value Rpq of a red component, a signal value Gpq of a green component, and a signal value Bpq of a blue component. In the following description it is assumed that a signal value Rpq of a red component, a signal value Gpq of a green component, and a signal value Bpq of a blue component are set as color information for a display cell Cpq in an image signal SRGB. The image signal SRGB may not correspond to the display cell Cpq on a one-to-one basis.

The synchronous drive section 70 acquires an image signal SRGB and synchronizes and drives the panel drive circuit 30 and the light source drive circuit 50. To be concrete, the synchronous drive section 70 synchronizes the driving of electrodes in a display cell Cpq by the panel drive circuit 30 with the emission of light from the side light source 40 by the light source drive circuit 50.

The details of each component will be described in order.

Figure 3A:
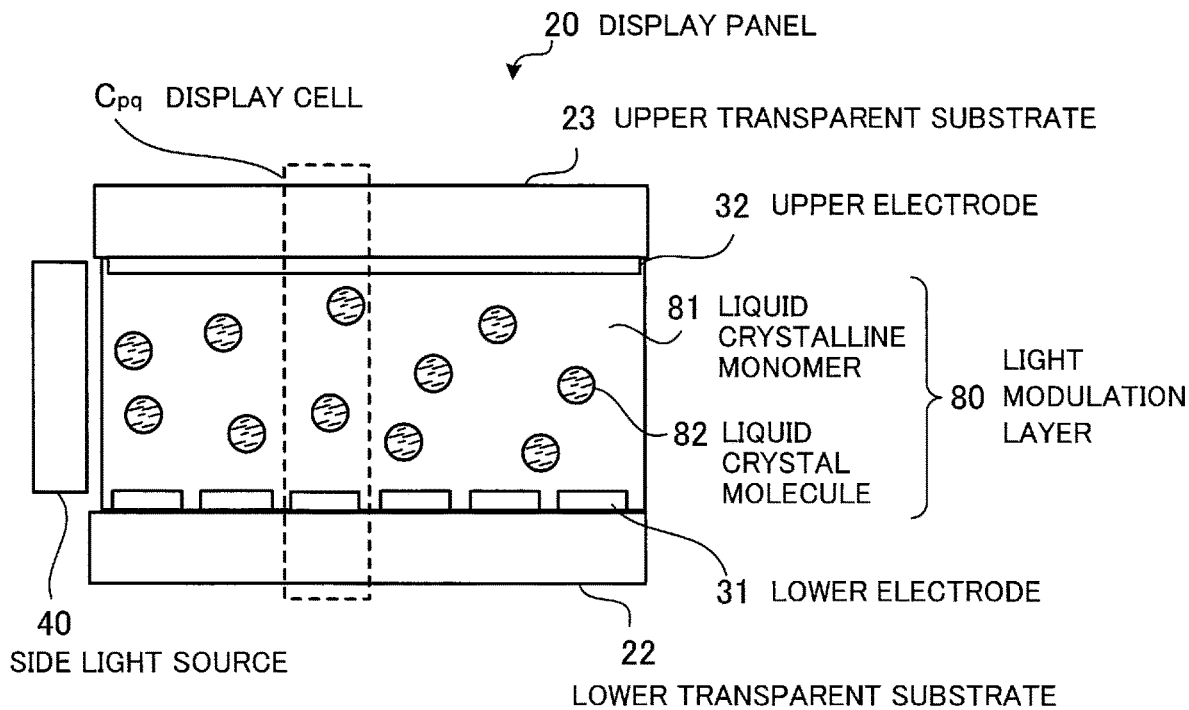
FIGS. 3A, 3B, and 3C illustrate the structure of a display panel in the second embodiment.
Figure 3B:
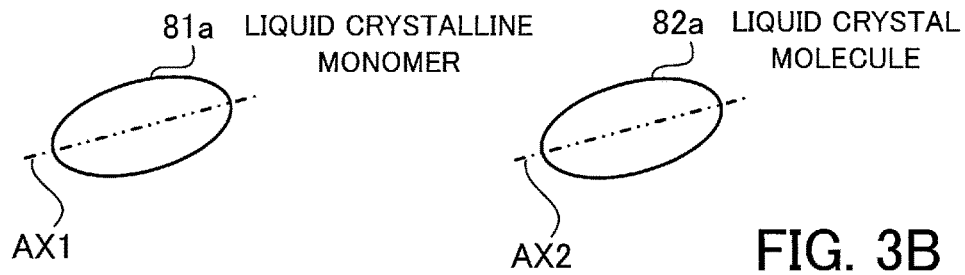
Figure 3C:
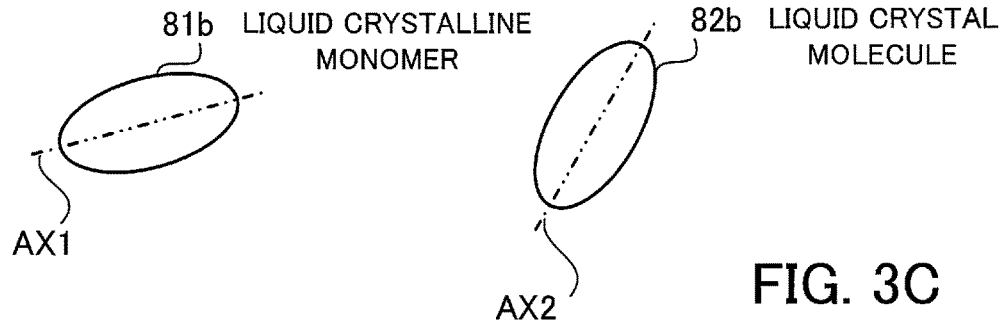

First the display panel 20 will be described. FIGS. 3A, 3B, and 3C illustrate the structure of the display panel in the second embodiment. FIG. 3A is a sectional view of the display panel. FIG. 3B illustrates an example of the state of a light modulation layer at the time of voltage not being applied. FIG. 3C illustrates an example of the state of the light modulation layer at the time of voltage being applied. In FIGS. 3B and 3C, the refractive index anisotropy of each light modulation element included in the light modulation layer is represented by the use of a refractive index ellipsoid. This refractive index ellipsoid represents the refractive indices of linearly polarized light which enters from various directions as a tensor ellipsoid. By viewing a section of the refractive index ellipsoid from a direction in which light enters, a refractive index is geometrically known.

As illustrated in FIG. 3A, the display panel 20 includes a lower transparent substrate 22 and an upper transparent substrate 23 disposed apart from each other, a lower electrode 31 formed on a surface of the lower transparent substrate 22 opposite the upper transparent substrate 23, an upper electrode 32 formed on a surface of the upper transparent substrate 23 opposite the lower transparent substrate 22, and a light modulation layer 80 disposed between the lower transparent substrate 22 and the upper transparent substrate 23. Furthermore, the side light source 40 is disposed along the side of the display panel 20 opposite the light modulation layer 80. The outer surfaces of the upper transparent substrate 23 and the lower transparent substrate 22 opposite to the light modulation layer 80 are open and are visually recognized by an observer.

The lower transparent substrate 22 and the upper transparent substrate 23 support the light modulation layer 80 and are usually transparent to visible light. For example, glass plates or resin substrates are used as the lower transparent substrate 22 and the upper transparent substrate 23.

By applying voltage to the lower electrode 31 and the upper electrode 32, an electric field is generated between the lower electrode 31 and the upper electrode 32 and acts in the light modulation layer 80 between the lower electrode 31 and the upper electrode 32. Furthermore, both of the lower electrode 31 and the upper electrode 32 are formed by the use of a transparent material. The shape of the lower electrode 31 and the upper electrode 32 depends on a drive method. Regardless of a drive method, however, it is possible to generate an electric field independently in an area corresponding to a display cell Cpq with the display cell Cpq as a drive unit. The structure of the lower electrode 31 and the upper electrode 32 will be described later.

The light modulation layer 80 includes light modulation elements of two types. The light modulation elements of two types are equal in refractive index anisotropy and are different in responsiveness to an electric field. With the display panel 20 illustrated in FIG. 3A, the light modulation layer 80 is a composite layer including a liquid crystalline monomer 81 and liquid crystal molecules 82 dispersed in the liquid crystalline monomer 81. The liquid crystalline monomer 81 and the liquid crystal molecules 82 are equal in ordinary refractive index and extraordinary refractive index. For example, refractive index deviation caused by manufacturing errors or the like is allowable. On the other hand, the responsiveness of the liquid crystal molecules 82 to an electric field is higher than the responsiveness of the liquid crystalline monomer 81 to an electric field. For example, the liquid crystalline monomer 81 has a striped structure or a porous structure which does not respond to an electric field or has a rod-like structure whose speed of a response to an electric field is slower than the speed of a response of the liquid crystal molecules 82 to an electric field. The liquid crystalline monomer 81 is an example of the first light modulation element 4a and the liquid crystal molecule 82 is an example of the second light modulation element 4b. In this connection, it is preferable that the liquid crystalline monomers 81 be polymerizable by light or heat hardening. Further, it is preferable that, when the liquid crystalline monomers 81 are polymerized, the liquid crystal molecules 82 and the liquid crystalline polymers (polymeric material) are hardened with their ordinary refractive indexes and extraordinary refractive indexes remaining equal to each other. Still further, it is preferable that the liquid crystalline monomers 82 have higher responsiveness to an electric field than liquid crystalline polymers. In the following, explanation about liquid crystalline monomers applies to liquid crystalline polymers formed by polymerizing the liquid crystalline monomers. In addition, the light modulation layer 80 of this embodiment is applicable to a composite layer including the liquid crystal molecules 82 dispersed in the polymeric material, that is, to a Polymer Dispersed Liquid Crystal (PDLC).

As illustrated in FIG. 3B, for example, the direction of an optical axis AX1 of a liquid crystalline monomer 81a and the direction of an optical axis AX2 of a liquid crystal molecule 82a match (the optical axis AX1 of the liquid crystalline monomer 81a and the optical axis AX2 of the liquid crystal molecule 82a are parallel to each other) in a state in which voltage is not applied between the lower electrode 31 and the upper electrode 32 and in which an electric field is not generated in the light modulation layer 80. Each of the optical axes AX1 and AX2 is parallel to a light traveling direction which makes a refractive index constant regardless of a polarization direction. There may be a slight deviation between the direction of the optical axis AX1 and the direction of the optical axis AX2 due to manufacturing errors or the like.

As illustrated in FIG. 3C, on the other hand, the direction of an optical axis AX1 of a liquid crystalline monomer 81b and the direction of an optical axis AX2 of a liquid crystal molecule 82b intersect in a state in which voltage is applied between the lower electrode 31 and the upper electrode 32 and in which an electric field is generated in the light modulation layer 80.

Figure 4A:
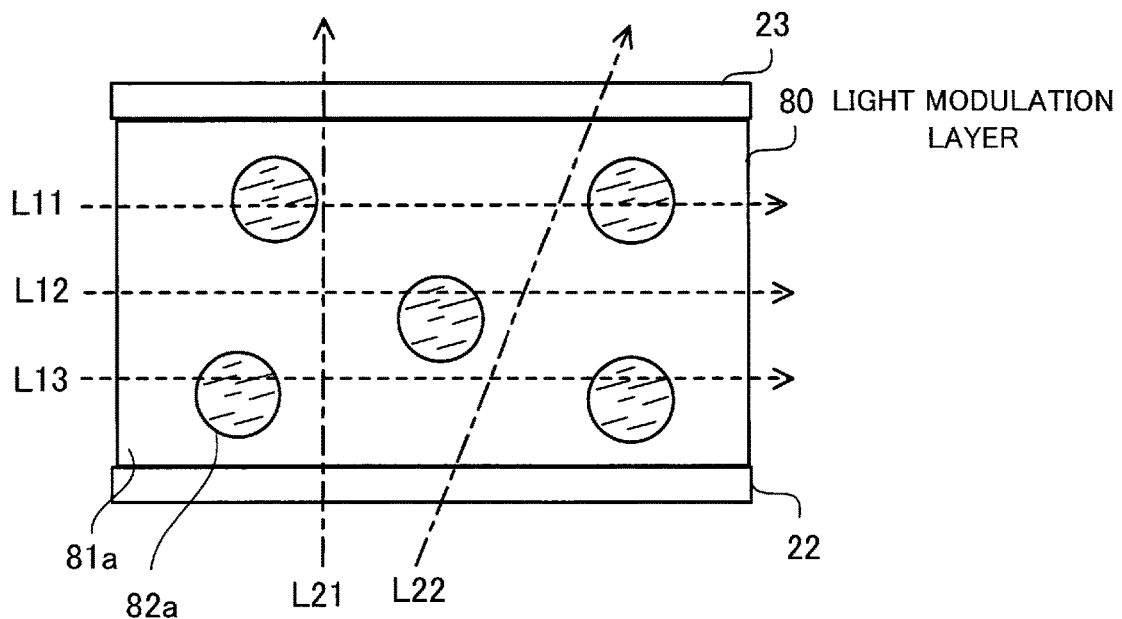
FIGS. 4A and 4B are schematic views for describing the function of a light modulation layer in the second embodiment.
Figure 4B:
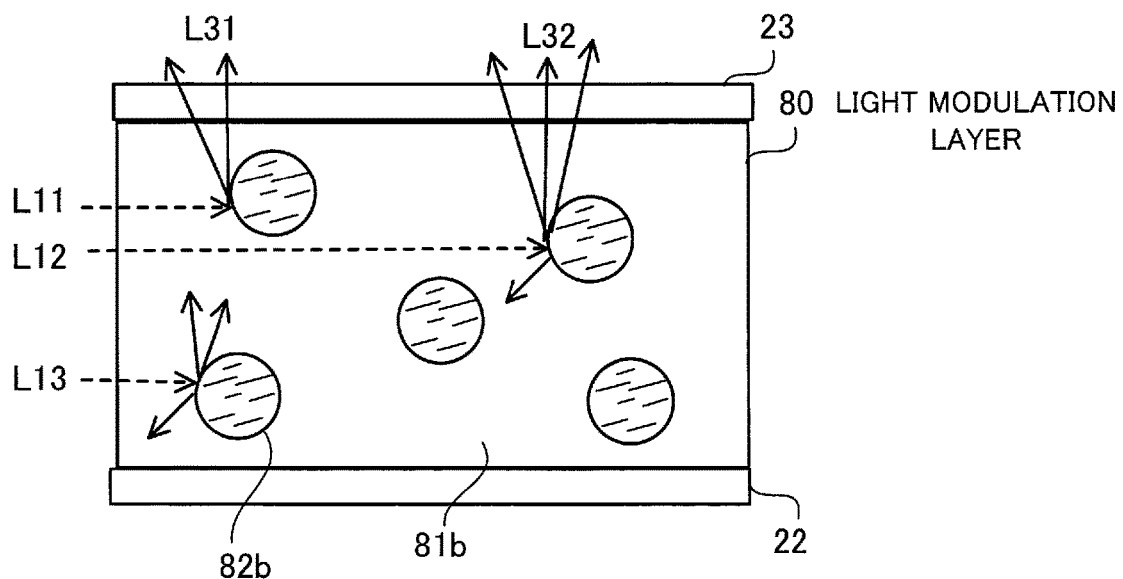

The function of the light modulation layer 80 will be described. FIGS. 4A and 4B are schematic views for describing the function of the light modulation layer in the second embodiment. FIG. 4A is a schematic view for describing the function of the light modulation layer in a state in which voltage is not applied. FIG. 4B is a schematic view for describing the function of the light modulation layer in a state in which voltage is applied.

In the state of FIG. 4A in which voltage is not applied, voltage is not applied between the upper electrode 32 and the lower electrode 31 and an electric field is not generated in the light modulation layer 80. In this state, as illustrated in FIG. 3B, the direction of the optical axis AX1 of the liquid crystalline monomer 81a and the direction of the optical axis AX2 of the liquid crystal molecule 82a match and there is little difference in refractive index in all directions including a front direction and an oblique direction. Accordingly, for example, incident lights L11, L12, and L13, which are emitted from the side light source 40 and enter the light modulation layer 80 from the side, as indicated by chain lines, pass through the light modulation layer 80 without being scattered in the light modulation layer 80. Light which is emitted from the side light source 40 and which travels to the lower transparent substrate 22 or the upper transparent substrate 23 is totally reflected and is not emitted to the outside. Furthermore, lights L21 and L22, which enter the lower transparent substrate 22 from the outside in a direction in which the lower transparent substrate 22, the light modulation layer 80, and the upper transparent substrate 23 are pierced, as indicated by dot-dash lines, are not scattered in the light modulation layer 80, but pass through the light modulation layer 80 and are emitted from the upper transparent substrate 23. That is to say, when voltage is not applied between the lower electrode 31 and the upper electrode 32, the light modulation layer 80 has high transparency.

In the state of FIG. 4B in which voltage is applied, on the other hand, voltage is applied between the upper electrode 32 and the lower electrode 31 and an electric field is generated in the light modulation layer 80. In this state, as illustrated in FIG. 3C, the direction of the optical axis AX1 of the liquid crystalline monomer 81b and the direction of the optical axis AX2 of the liquid crystal molecule 82b intersect and there is a great difference in refractive index in all directions including a front direction and an oblique direction. As a result, a powerful scattering property is obtained. For example, incident lights L11, L12, and L13, which are emitted from the side light source 40 and enter the light modulation layer 80 from the side, are scattered in the light modulation layer 80, and scattered lights L31 and L32 are emitted from the upper transparent substrate 23. As a result, when the upper transparent substrate 23 is observed from above in FIG. 4B, the scattered lights L31 and L32 are visually recognized. This is the same with a case where the lower transparent substrate 22 is observed from below in FIG. 4B.

With the display device 10 having the above structure, light which passes through the light modulation layer 80 in a direction in which the lower transparent substrate 22, the light modulation layer 80, and the upper transparent substrate 23 are pierced is visually recognized in a state in which voltage is not applied when the upper transparent substrate 23 or the lower transparent substrate 22 is viewed from the front. In a state in which voltage is applied, on the other hand, incident light which is emitted from the side light source 40, which is scattered in the light modulation layer 80, and which is emitted is visually recognized.

Figure 5:
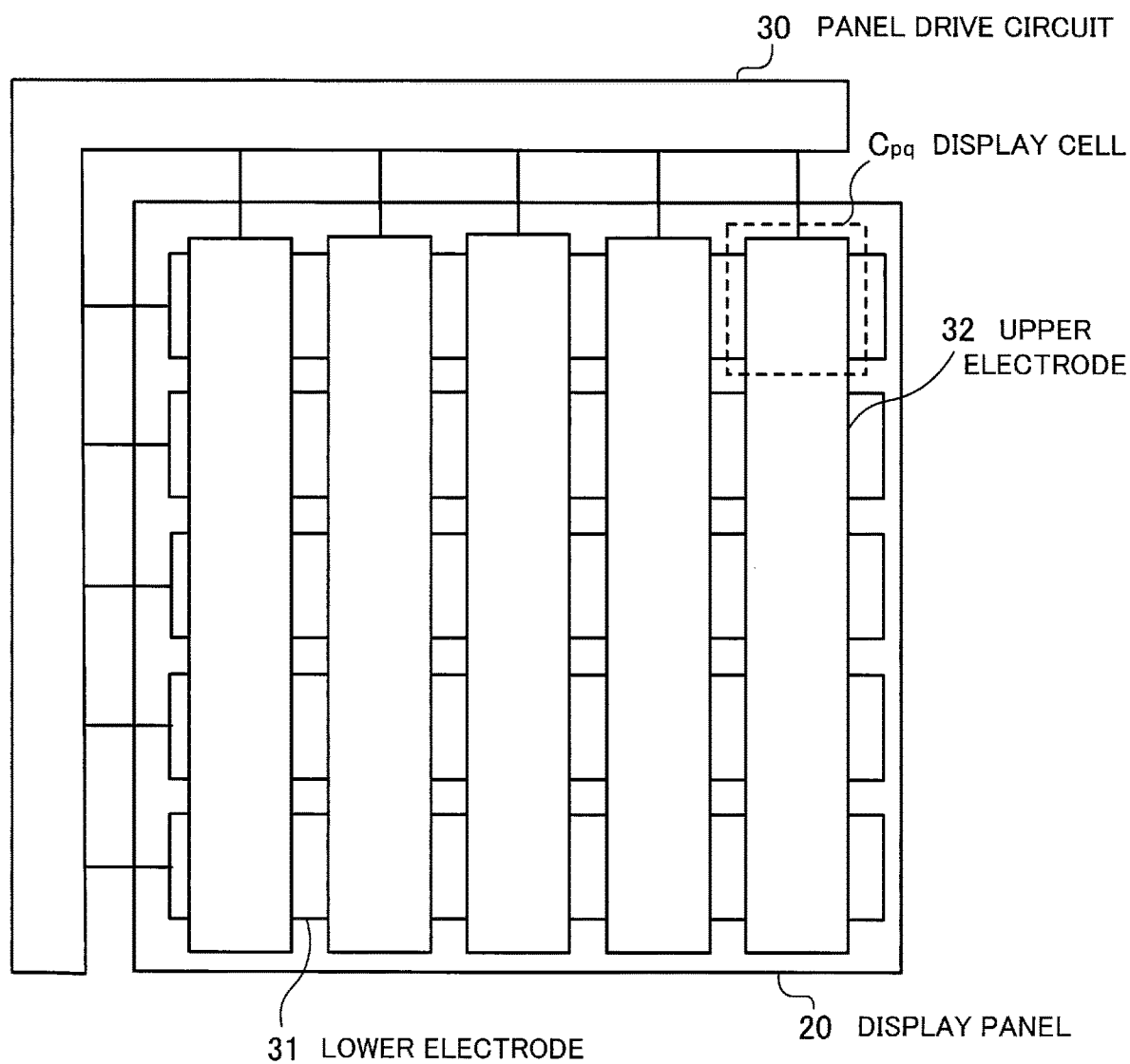
FIG. 5 illustrates the structure of a panel drive circuit in the second embodiment.

The panel drive circuit 30 will now be described. FIG. 5 illustrates the structure of the panel drive circuit in the second embodiment.

The panel drive circuit 30 is connected to plural belt-like lower electrodes 31 and plural belt-like upper electrodes 32. By selectively driving a lower electrode 31 and an upper electrode 32, the panel drive circuit 30 controls the generation or extinction of an electric field corresponding to a display cell Cpq.

Each lower electrode 31 is a transparent electrode formed on the lower transparent substrate 22. Each lower electrode 31 has a shape like a belt and extends in one direction in the plane of the lower transparent substrate 22. Each upper electrode 32 is a transparent electrode formed on the upper transparent substrate 23. Each upper electrode 32 has a shape like a belt and extends in one direction in the plane of the upper transparent substrate 23 that intersects the direction in which each lower electrode 31 extends. A portion at which a lower electrode 31 and an upper electrode 32 intersect is an area corresponding to the display cell Cpq. The direction in which each lower electrode 31 extends may be perpendicular to the direction in which each upper electrode 32 extends.

The panel drive circuit 30 drives the plural lower electrodes 31 and the plural upper electrodes 32 in order. That is to say, the panel drive circuit 30 controls simple matrix drive. If simple matrix drive is adopted, there is no need to form wirings or the like in the plane of the display panel 20, and higher transparency is realized.

One electrode may be formed by forming a film on the whole surface (that is to say, shaping is not performed after the formation of a film) and the other electrode may be made up of minute subelectrodes having a square shape. In this case, each subelectrode may be active-matrix-driven. In addition, various drive methods are known as a method for driving the light modulation layer 80 with the display cell Cpq as a unit. These drive methods are properly used according to the use or the like of the display device 10. By doing so, the function of the panel drive circuit 30 is realized.

Figure 6:
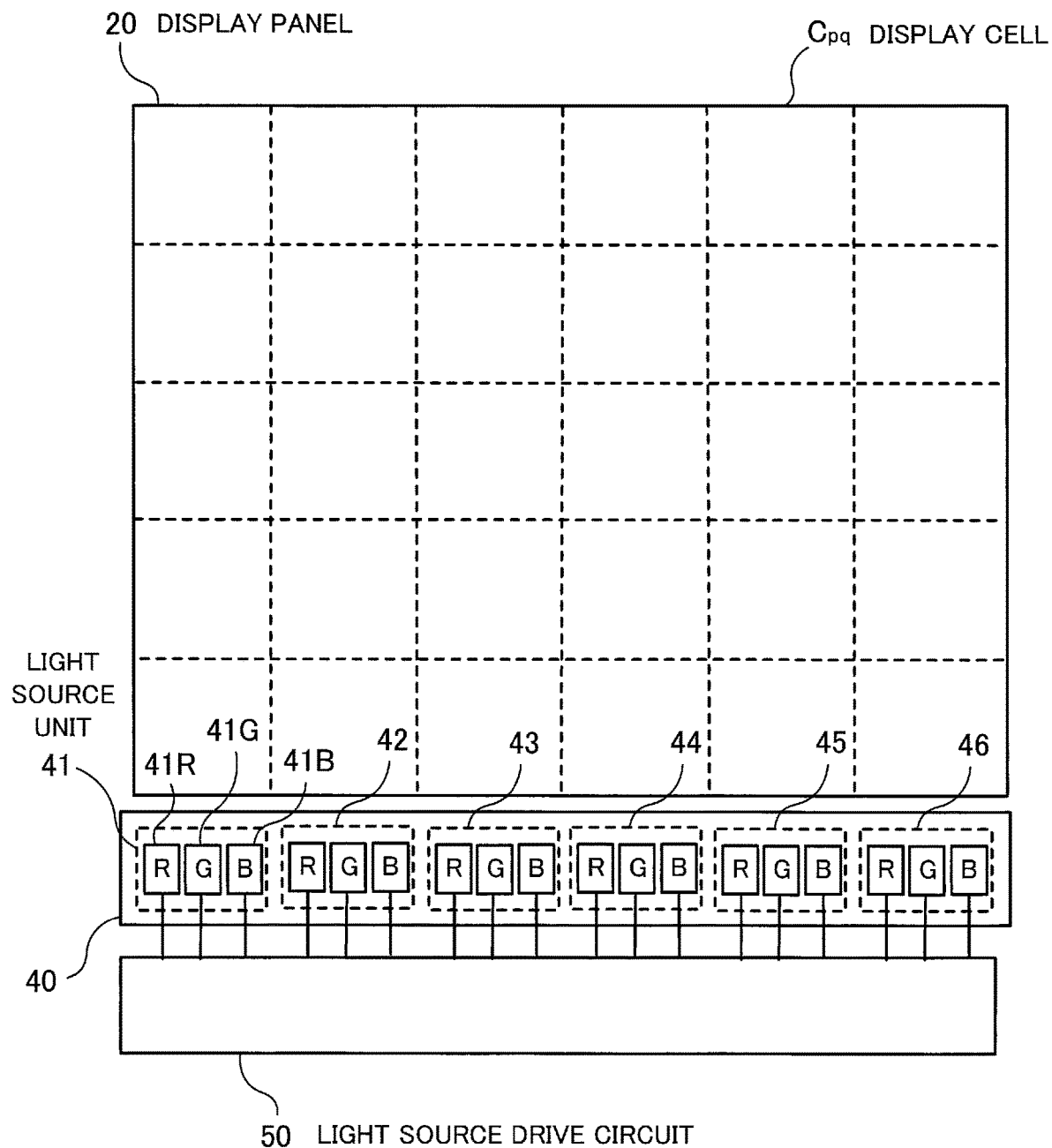
FIG. 6 illustrates the structure of a side light source in the second embodiment.

The side light source 40 will now be described. FIG. 6 illustrates the structure of the side light source in the second embodiment.

The side light source 40 has a structure in which light source units 41, 42, 43, 44, 45, and 46 are arranged in order along one side of the display area of the display panel 20, and is connected to the light source drive circuit 50 which drives each light source.

The light source unit 41 includes a red light source 41R which emits red light, a green light source 41G which emits green light, and a blue light source 41B which emits blue light. The red light source 41R, the green light source 41G, and the blue light source 41B are connected to the light source drive circuit 50 and are driven independently of one another. The other light source units 42, 43, 44, 45, and 46 have the same structure. Excluding a case where a light source unit is specially designated for explanation, a red light source, a green light source, and a blue light source included in a light source unit are represented by 4 nR, 4 nG, and 4 nB respectively.

On the basis of a drive signal from the synchronous drive section 70, the light source drive circuit 50 drives each of a red light source 4 nR, a green light source 4 nG, and a blue light source 4 nB. For example, by lighting the red light source 41R included in the light source unit 41, red light enters an area of the light modulation layer 80 corresponding to a column of display cells at the left edge of the display panel 20. Similarly, by lighting the green light source 41G or the blue light source 41B, green light or blue light enters. The light source drive circuit 50 emits incident light of each color in order into the light modulation layer 80 in synchronization with the panel drive circuit 30 to display a desired color with a display cell Cpq as a unit. The red light source 4 nR, the green light source 4 nG, or the blue light source 4 nB alone may be lighted. Furthermore, more than one of the red light source 4 nR, the green light source 4 nG, and the blue light source 4 nB may be lighted simultaneously. For example, if the red light source 4 nR and the blue light source 4 nB are lighted simultaneously, magenta light enters the display panel 20. Similarly, if all of the red light source 4 nR, the green light source 4 nG, and the blue light source 4 nB are lighted simultaneously, white light enters the display panel 20. In addition, for example, in order to display a single color, light of a desired color may be generated by combining lighting time and the light emission intensity of each light source and enter the light modulation layer 80.

In the example of FIG. 6, one light source unit is disposed for one column of display cells. However, plural light source units may be disposed for one column of display cells. Furthermore, the red light source 4 nR, the green light source 4 nG, and the blue light source 4 nB are arranged in the direction in which the side light source 40 extends. However, for example, the red light source 4 nR, the green light source 4 nG, and the blue light source 4 nB may be arranged in a direction perpendicular to the direction in which the side light source 40 extends. How to arrange the red light source 4 nR, the green light source 4 nG, and the blue light source 4 nB does not matter as long as lights of the three primary colors enter a column of display cells.

Figure 7:
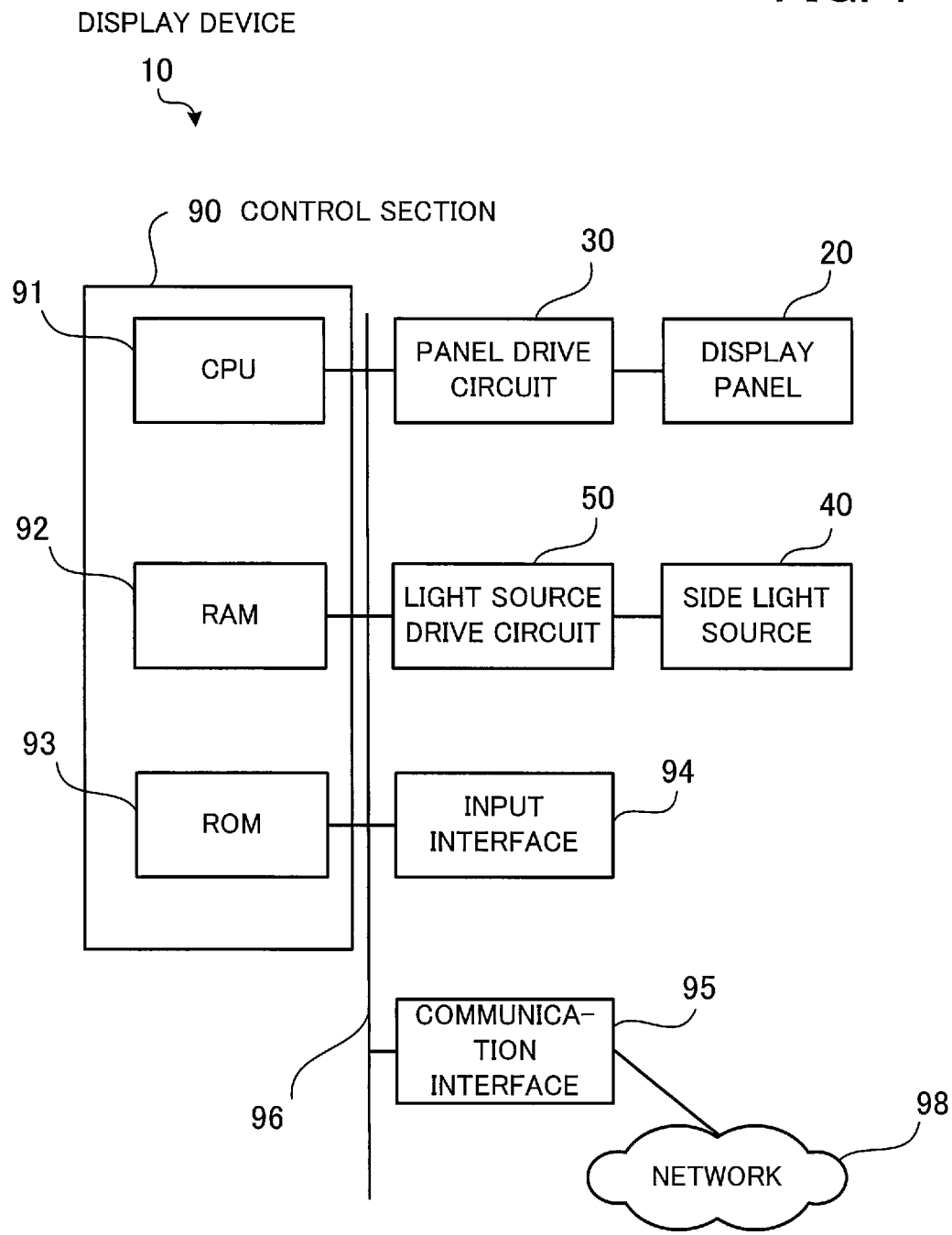
FIG. 7 illustrates the hardware configuration of the display device according to the second embodiment.

The hardware configuration will now be described. FIG. 7 illustrates the hardware configuration of the display device according to the second embodiment.

The whole of the display device 10 is controlled by a control section 90. The control section 90 includes a central processing unit (CPU) 91. A random access memory (RAM) 92, a read only memory (ROM) 93, and a plurality of peripheral units are connected to the CPU 91 via a bus 96.

The CPU 91 is a processor which realizes the processing functions of the control section 90.

The RAM 92 is used as main storage of the control section 90. The RAM 92 temporarily stores at least part of an operating system (OS) program or an application program executed by the CPU 91. In addition, the RAM 92 stores various pieces of data which the CPU 91 needs to perform a process.

The ROM 93 is a read only semiconductor memory and stores the OS program, application programs, and fixed data which is not rewritten. Furthermore, a semiconductor memory, such as a flash memory, may be used as auxiliary storage in place of the ROM 93 or in addition to the ROM 93.

The plurality of peripheral units connected to the bus 96 are the panel drive circuit 30, the light source drive circuit 50, an input interface 94, and a communication interface 95.

The display panel 20 is connected to the panel drive circuit 30.

The side light source 40 is connected to the light source drive circuit 50.

An input device used for inputting a user's instructions and an interface used for acquiring an image signal from another apparatus are connected to the input interface 94. The input interface 94 transmits to the CPU 91 a signal transmitted from the input device or another apparatus.

The communication interface 95 is connected to a network 98. The communication interface 95 transmits data to or receives data from another computer or a communication apparatus via the network 98.

By adopting the above hardware configuration, the processing functions in the second embodiment are realized. The above configuration is an example and is changed properly.

The processing functions of the image output section 60 and the synchronous drive section 70 illustrated in FIG. 2 are realized by the control section 90.

Figure 8:
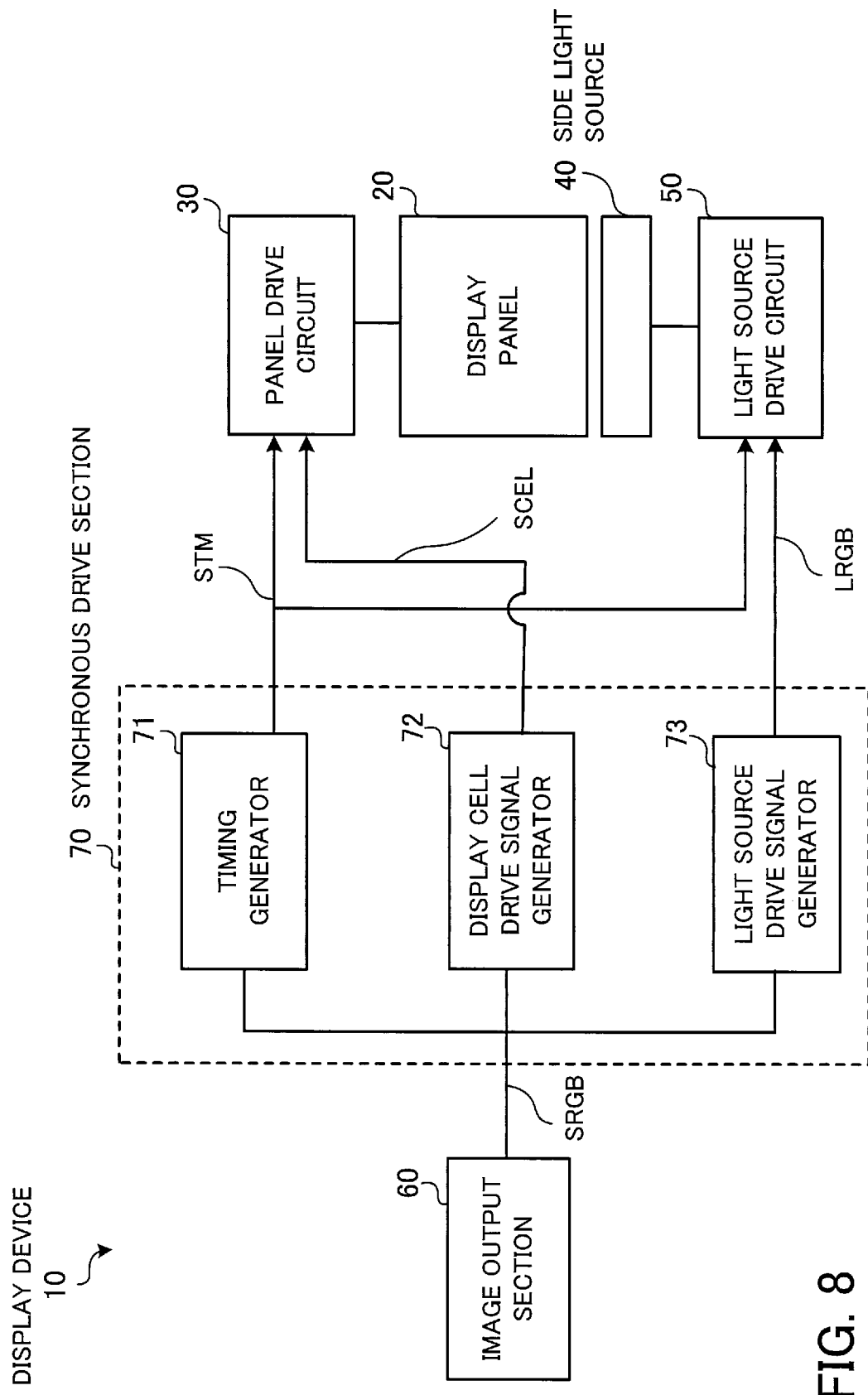
FIG. 8 is a block diagram of the structure of the functions of the display device according to the second embodiment.

The structure of the functions of the display device 10 will now be described. FIG. 8 is a block diagram of the structure of the functions of the display device according to the second embodiment.

The display device 10 includes the synchronous drive section 70 which synchronizes and drives the panel drive circuit 30 and the light source drive circuit 50 on the basis of an image signal SRGB inputted from the image output section 60. The synchronous drive section 70 includes a timing generator 71 which generates a synchronization signal STM, a display cell drive signal generator 72, and a light source drive signal generator 73.

A process performed by each component of the synchronous drive section 70 will be described.

The timing generator 71 generates a synchronization signal STM for synchronizing the operation timing of the panel drive circuit 30 with that of the light source drive circuit 50. The timing generator 71 outputs the generated synchronization signal STM to the panel drive circuit 30 and the light source drive circuit 50.

The display cell drive signal generator 72 generates, on the basis of an image signal SRGB, a display cell drive signal SCEL for driving electrodes corresponding to a display cell Cpq. The display cell drive signal SCEL, together with the synchronization signal STM, is outputted to the panel drive circuit 30. Drive values corresponding to a signal value Rpq of a red component, a signal value Gpq of a green component, and a signal value Bpq of a blue component contained in the image signal SRGB are set in the display cell drive signal SCEL.

The light source drive signal generator 73 generates, on the basis of the image signal SRGB, a light source drive signal LRGB for driving a red light source 4 nR, a green light source 4 nG, and a blue light source 4 nB corresponding to the display cell Cpq and outputs the light source drive signal LRGB to the light source drive circuit 50.

The panel drive circuit 30 and the light source drive circuit 50 are synchronized and driven by the synchronization signal STM. For example, in synchronization with the lighting of the red light source 4 nR by the light source drive circuit 50 based on the light source drive signal LRGB, the panel drive circuit 30 applies voltage corresponding to a signal value Rpq of a red component for the display cell Cpq contained in the display cell drive signal SCEL to the electrodes corresponding to the display cell Cpq. As a result, red scattered light corresponding to the luminance of the red light source 4 nR lighted by the light source drive circuit 50 and the voltage which the panel drive circuit 30 applies to the electrodes is emitted from the display cell Cpq. The same applies to the other colors.

By synchronizing and driving the panel drive circuit 30 and the light source drive circuit 50 in this way, the display of the signal value Rpq of the red component, the signal value Gpq of the green component, and the signal value Bpq of the blue component contained in the image signal SRGB is reproduced by the display cell Cpq.

In order to reproduce each color component, the synchronous drive section 70 properly determines, on the basis of the image signal SRGB, light emission time or the light emission intensity (luminance) of the red light source 4 nR, the green light source 4 nG, or the blue light source 4 nB or time for which voltage is applied to electrodes or the magnitude of voltage applied to electrodes.

(2) Display Function

A display process performed by the display device 10 having the above structure will now be described by the use of FIG. 9.

Figure 9:
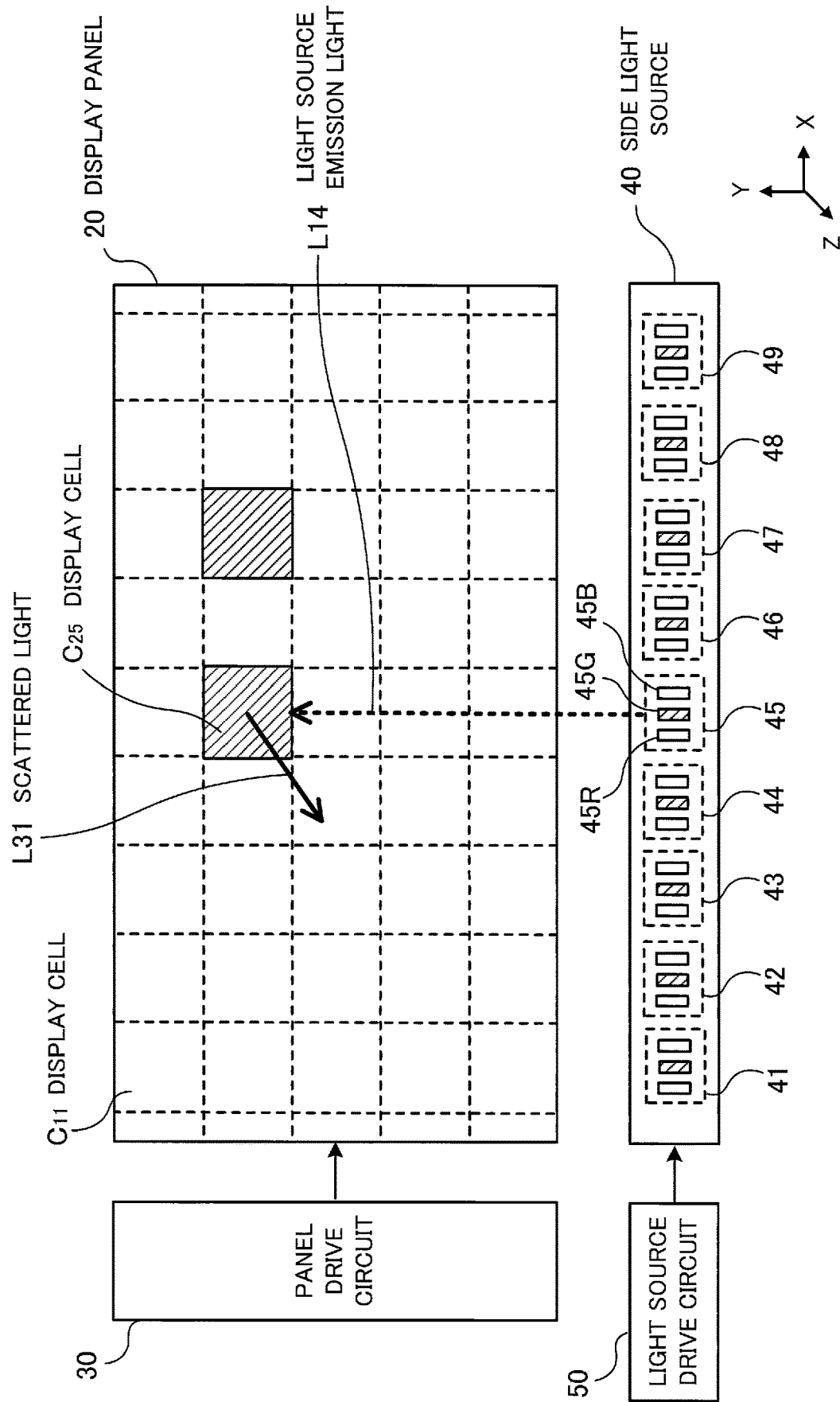
FIG. 9 is a view for describing an example of synchronous drive control in the second embodiment.

FIG. 9 is a view for describing an example of synchronous drive control in the second embodiment. The synchronous drive section 70 is not illustrated in FIG. 9.

The panel drive circuit 30 controls simple matrix drive. That is to say, the panel drive circuit 30 applies voltage in order to electrodes which generates an electric field in the light modulation layer 80 corresponding to a display cell Cpq. In one image display frame in which an image based on an image signal SRGB is displayed on the display panel 20, the panel drive circuit 30 exercises control so as to apply voltage to electrodes corresponding to a display cell Cpq when the side light source 40 lights a red light source 4 nR, a green light source 4 nG, and a blue light source 4 nB, that is to say, a total of three times. As a result, lights of a signal value Rpq of a red component, a signal value Gpq of a green component, and a signal value Bpq of a blue component corresponding to the display cell Cpq contained in the image signal SRGB are emitted in order from the light modulation layer 80 and an observer visually recognizes colors corresponding to the image signal SRGB. If all the color components contained in the image signal SRGB are 0, then the electrodes corresponding to the display cell Cpq are not driven and the observer visually recognizes the transparent state of the display cell Cpq.

As illustrated in FIG. 9, for example, it is assumed that the light source drive circuit 50 to which a synchronization signal STM and a light source drive signal LRGB are inputted makes the light source unit 45 of the side light source 40 light a green light source 45G. As a result, light source emission light L14 of the green light source 45G enters a light modulation layer area corresponding to a display cell C25. When the light source emission light L14 enters the light modulation layer area corresponding to the display cell C25, the panel drive circuit 30 applies voltage to electrodes corresponding to the display cell C25 on the basis of the synchronization signal STM. The magnitude of the applied voltage or time for which the voltage is applied is determined by the display cell drive signal generator 72 according to the intensity of the light source emission light L14 and a signal value G25 of a green component for the display cell C25. By applying the voltage to the electrodes corresponding to the display cell C25, the light modulation layer area corresponding to the display cell C25 goes into a scattering state and scattered light L31 of the light source emission light L14 is emitted. As a result, the observer visually recognizes green. The same process is also performed for another display cell Cpq. In addition, the same process is performed on a signal value Rpq of a red component and a signal value Bpq of a blue component for each display cell Cpq. As a result, a cycle of one image display frame ends.

As has been described, the synchronous drive section 70 synchronizes the application of voltage to electrodes by the panel drive circuit 30 with the driving of the side light source 40 by the light source drive circuit 50 for each color component to display colors based on the image signal SRGB on the display cell Cpq.

In the above description, the signal value Rpq of the red component, the signal value Gpq of the green component, and the signal value Bpq of the blue component are contained in the image signal SRGB and the lighting of the corresponding red light source 4 nR, green light source 4 nG, or blue light source 4 nB is synchronized with the driving of the electrodes. However, the present disclosure is not limited to them. For example, cyan, magenta, and yellow may be contained as color components. In addition, when electrodes are driven, a green light source 4 nG and a blue light source 4 nB, a red light source 4 nR and the blue light source 4 nB, or the red light source 4 nR and the green light source 4 nG may be lighted. Furthermore, the types of color light sources included in the side light source 40, a combination of color light sources lighted at the time of driving electrodes, or the like is properly selected according to desired display.

In addition, the technique of synchronizing the application of voltage to electrodes by the panel drive circuit 30 with the driving of the side light source 40 by the light source drive circuit 50 and a drive method are properly determined. Field sequential control and line sequential control will now be described as examples. In the following description the process of applying voltage to electrodes corresponding to a display cell Cpq in determined order will be referred to as scanning.

With the field sequential control, the scanning of a display cell Cpq is synchronized with control of the switching of the color of light emitted from the side light source 40 by the display area (field). With the line sequential control, on the other hand, the scanning of a display cell Cpq is synchronized with control of the switching of the color of light emitted from the side light source 40 by the block of one or more columns of light source units included in the side light source 40.

Figure 10:
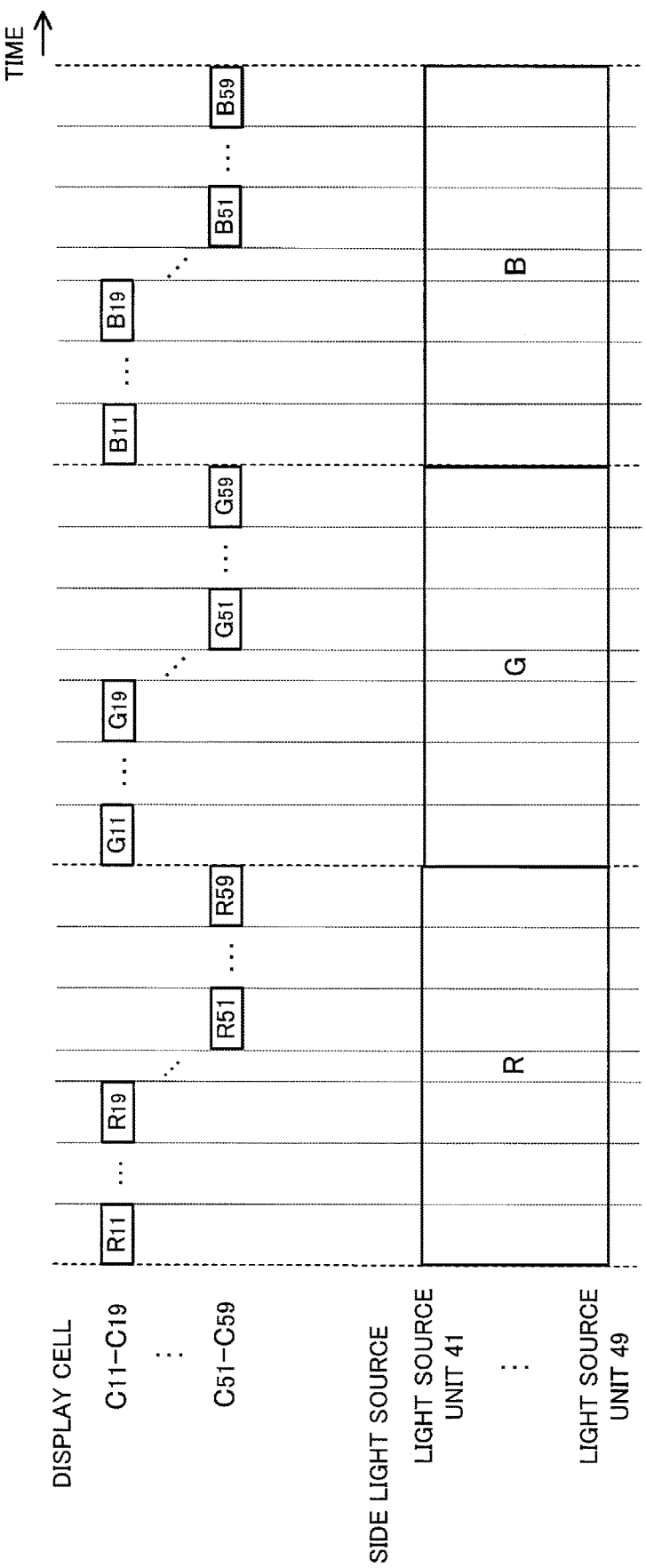
FIG. 10 illustrates operation timing in field sequential control in the second embodiment.

First the field sequential control will be described. FIG. 10 illustrates operation timing in field sequential control in the second embodiment. In FIG. 10, Rpq, Gpq, and Bpq indicate that a corresponding display cell Cpq displays red (R), green (G), and blue (B) respectively. Similarly, R, G, and B corresponding to light source units indicate that each light source unit lights a red light source 4 nR, a green light source 4 nG, and a blue light source 4 nB respectively.

With the field sequential control, as illustrated in FIG. 10, the same color light sources included in the side light source 40 are lighted simultaneously and all display cells Cpq in the display area are scanned. After the scanning ends, the color of light emitted from the side light source 40 is switched simultaneously. This procedure is repeated.

In the example of FIG. 10, the panel drive circuit 30 scans the display cells Cpq according to rows in the order of a driven line including display cells C11 to C19, a driven line including display cells C21 to C29, . . . , and a driven line including display cells C51 to C59. A Y direction which is indicated in FIG. 9 and in which light emitted from the side light source 40 enters the display panel 20 differs from an X direction in which the display cells Cpq are scanned.

With the field sequential control the color of light emitted from the side light source 40 is switched by the field. Accordingly, in the example of FIG. 10, light source units 41 through 49 light red light sources 41R through 49R, respectively, in the first scanning for a period from the time when the first display cell C11 is driven to the time when the last display cell C59 is driven. The panel drive circuit 30 drives electrodes corresponding to each display cell Cpq in order on the basis of a display cell drive signal SCEL acquired from the display cell drive signal generator 72. As a result, each display cell Cpq displays a signal value Rpq of a red component contained in an image signal SRGB.

The light source drive circuit 50 switches light sources of the light source units 41 through 49 to be lighted from the red light sources 41R through 49R to green light sources 41G through 49G, respectively, at the timing at which the scanning of the last display cell C59 that displays red ends. The light source units 41 through 49 light the green light sources 41G through 49G, respectively, in the second scanning. The panel drive circuit 30 drives electrodes corresponding to each display cell Cpq in order on the basis of a display cell drive signal SCEL. As a result, each display cell Cpq displays a green component Gpq of the image signal SRGB.

The light source drive circuit 50 switches light sources of the light source units 41 through 49 to be lighted from the green light sources 41G through 49G to blue light sources 41B through 49B, respectively, at the timing at which the scanning of the last display cell C59 that displays green ends. The light source units 41 through 49 light the blue light sources 41B through 49B, respectively, in the third scanning. The panel drive circuit 30 performs scanning and each display cell Cpq displays a blue component Bpq of the image signal SRGB.

A signal value Rpq of a red component, a signal value Gpq of a green component, and a signal value Bpq of a blue component are displayed in order in this way and an image based on the image signal SRGB is displayed on the display panel 20. In FIG. 10, the display cells Cpq are scanned in the X direction. However, the display cells Cpq may be scanned in the Y direction. In addition, the colors may be emitted from the side light source 40 in an order other than the above order.

Figure 11:
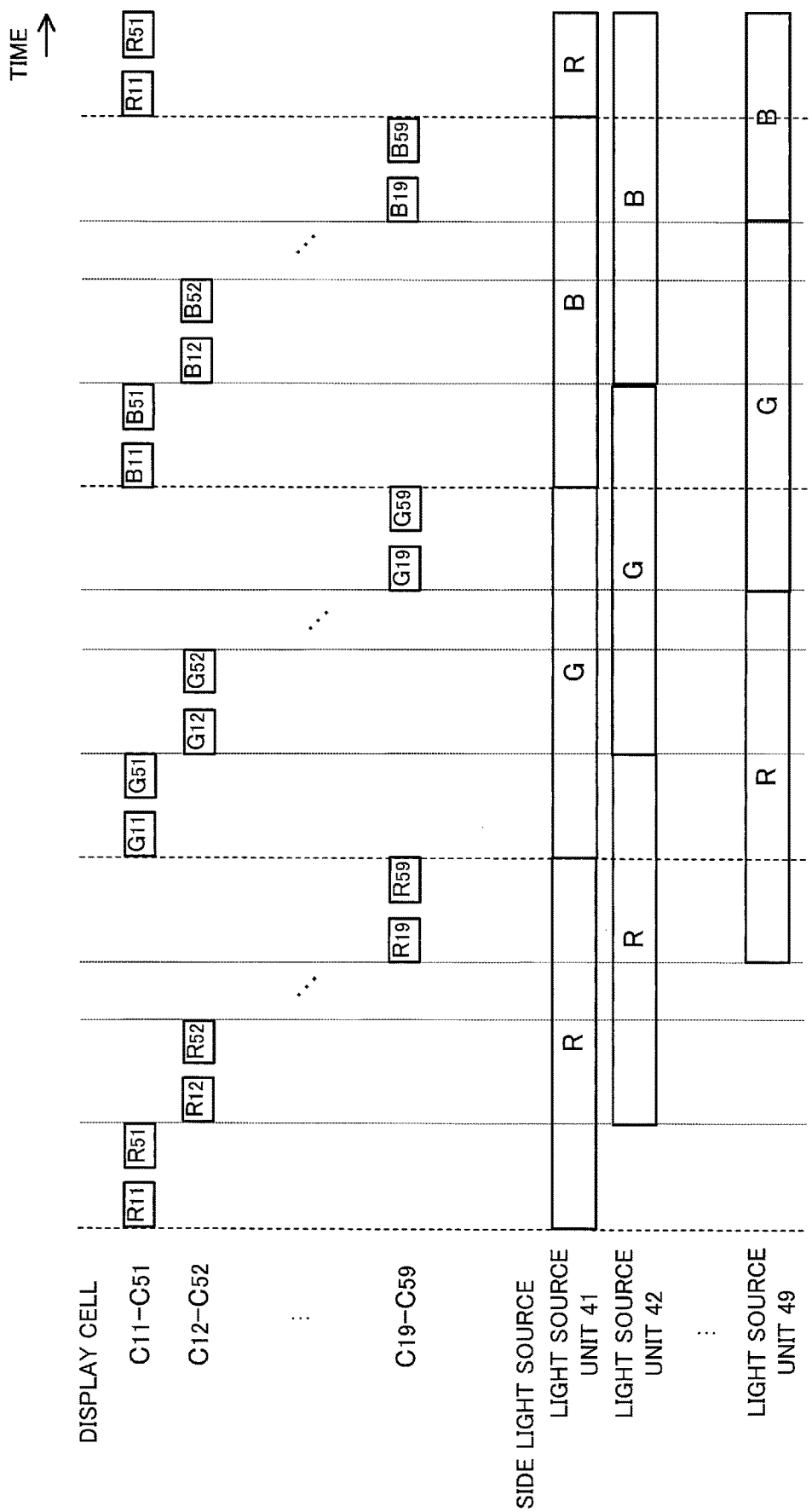
FIG. 11 illustrates operation timing in line sequential control in the second embodiment.

Next, the line sequential control will be described. FIG. 11 illustrates operation timing in the line sequential control in the second embodiment. Numerals indicated in FIG. 11 are the same as those in FIG. 10.

In the example of FIG. 11, the light source drive circuit 50 drives each color light source in the order of the light source units 41, 42, 43, 44, 45, 46, 47, 48, and 49. The panel drive circuit 30 corresponds to each color light source and performs scanning with a group of display cells Cpq arranged in the direction in which light emitted from each color light source travels in the light modulation layer 80 as a unit. To be concrete, the panel drive circuit 30 scans the display cells Cpq according to columns in the order of a driven line corresponding to the light source unit 41 including the display cells C11 to C51, a driven line corresponding to the light source unit 42 including the display cells C12 to C52, . . . , and a driven line corresponding to the light source unit 49 including the display cells C19 to C59. With the control illustrated in FIG. 11, the Y direction, indicated in FIG. 9, in which light emitted from the side light source 40 enters the display panel 20 is the same as the direction (Y direction) in which the display cells Cpq are scanned.

In the example of FIG. 11, the light source drive circuit 50 lights a red light source 41R of the light source unit 41 in the first scanning. The panel drive circuit 30 scans the corresponding display cells C11 to C51 in the first column and displays red components R11 to R51. The light source drive circuit 50 then lights a red light source 42R of the adjacent light source unit 42. The panel drive circuit 30 scans the corresponding display cells C12 to C52 in the second column and displays red components R12 to R52. The same process is repeated according to columns. The light source drive circuit 50 lights a red light source 49R of the light source unit 49. The panel drive circuit 30 scans the corresponding display cells C19 to C59 in the ninth column and displays red components R19 to R59.

The light source drive circuit 50 switches a light source of the light source unit 41 to be lighted from the red light source 41R to a green light sources 41G in the second scanning. The panel drive circuit 30 scans the corresponding display cells C11 to C51 in the first column and displays green components G11 to G51. The same process is repeated according to columns and the panel drive circuit 30 displays green components G19 to G59.

The light source drive circuit 50 switches a light source of the light source unit 41 to be lighted from the green light source 41G to a blue light sources 41B in the third scanning. The panel drive circuit 30 scans the corresponding display cells C11 to C51 in the first column and displays blue components B11 to B51. The same process is repeated according to columns and the panel drive circuit 30 displays blue components B19 to B59.

A signal value Rpq of a red component, a signal value Gpq of a green component, and a signal value Bpq of a blue component are displayed in order in this way and an image based on an image signal SRGB is displayed on the display panel 20. In FIG. 11, the side light source 40 is controlled by the light source unit. However, the above process may be performed by the block including several light source units.

Furthermore, in the example of FIG. 11, for example, the light source unit 41 keeps the red (R) light source 41R in an on state for a period after the light source drive circuit 50 lights the red (R) light source 41R of the light source unit 41 and the panel drive circuit 30 scans the display cells C11 to C51. However, the red (R) light source 41R may be put out. Incident light from the red (R) light source 41R of the light source unit 41 is needed only for a period for which the corresponding display cells C11 to C51 are scanned. Accordingly, control may be exercised so as to light the red (R) light source 41R only for this period. The same applies to the other colors or the other display cells Cpq.

By exercising control in this way, the power consumption of the side light source 40 is reduced.

In addition, for example, multi line selection which is used in simple matrix type liquid crystal panels and in which plural scanning electrodes are simultaneously selected may be used in place of the field sequential control or the line sequential control.

As stated above, with the display device 10 the synchronous drive section 70 synchronizes the scanning of a display cell Cpq by the panel drive circuit 30 with the switching, by the light source drive circuit 50, of each color emitted from the side light source 40. As a result, when voltage is applied to electrodes, incident light, which is emitted from the side light source 40 and enters the light modulation layer 80 corresponding to the display cell Cpq, is scattered according to the magnitude of the voltage. When voltage is not applied to the electrodes, incident light, which is emitted from the side light source 40 and enters the light modulation layer 80 corresponding to the display cell Cpq, passes through the light modulation layer 80. That is to say, with the display device 10, a display cell Cpq in which voltage is not applied to electrodes is in a transparent state and a display cell Cpq in which voltage is applied to electrodes is in a scattering state. With the display device 10 according to the second embodiment in particular, there is little difference in refractive index between the liquid crystalline monomer 81 and the liquid crystal molecules 82 contained in the light modulation layer 80 in a state in which voltage is not applied to electrodes. As a result, high transparency is obtained.

The above display device 10 has high transparency in a state in which voltage is not applied to electrodes, so the display device 10 is applicable to a field in which it is difficult to use conventional normal PDLC. It is assumed that a state in which voltage is not applied to electrodes in all display cells Cpq of the display panel 20 is referred to as normal time. For example, a use in which the display device 10 is in a transparent state at the normal time and in which an image is displayed on the display panel 20 on the basis of an image signal SRGB at the time of there being need for display is possible. The display device 10 is in a transparent state at the normal time, so an observer visually recognizes an object behind the display device 10. Accordingly, a mirror, a blackboard, or the like may be disposed behind the display device 10. The observer visually recognizes and uses the mirror or the blackboard at the normal time. Information is displayed over the mirror or the blackboard at need.

(3) Modification

A modification of the second embodiment will now be described.

With the line sequential control illustrated in FIG. 11, lights of plural colors simultaneously enter the light modulation layer 80. If a light emitting diode (LED), for example, is used as alight source, then light having relatively high directivity enters. If adjacent light source units emit incident lights of different colors, then the colors may mingle at the boundary between the incident lights. In order to perform clear display, it is desirable to prevent the colors of the incident lights from mingling.

Accordingly, a synchronous drive section 70 controls the driving of a panel drive circuit 30 and a light source drive circuit 50 to prevent the colors of incident lights from mingling. To be concrete, the synchronous drive section 70 exercises drive control so as to bring about a state in which light emitted from the same color light source enters a column of display cells Cpq adjacent to a column of display cells Cpq to be driven or a state in which light does not enter a column of display cells Cpq adjacent to a column of display cells Cpq to be driven.

For example, display cells Cpq are divided into subblocks in the direction in which light emitted from a side light source 40 enters, and interlace drive is performed. The color of incident light is the same in each subblock. For example, the display cells Cpq illustrated in FIG. 9 are alternately scanned every other subblock and a light source unit corresponding to display cells Cpq in a subblock not to be driven is turned off. By doing so, the colors of incident lights which enter display cells Cpq in driven subblocks do not mingle.

Furthermore, when a color light source is switched in each light source unit, a non-lighting period may be set for a light source. For example, a non-lighting period is set in a period for which the display cells C11 to C51 are scanned before a lighted light source is switched from the red light source 42R to the green light source 42G in the light source unit 42 illustrated in FIG. 11. The adjacent light source unit 42 is not lighted for the period for which the display cells C11 to C51 are scanned, so the color of light which enters the display cells C11 to C51 does not mingle with the color of another light. The adjacent light source unit 41 is lighted for a period for which the display cells C12 to C52 in the next column are scanned. However, the same color light sources are lighted in the light source units 41 and 42. Accordingly, colors do not mingle. The other adjacent light source unit 43 is turned off, so the scanning of the display cells C12 to C52 is not influenced.

As has been described, control by the synchronous drive section 70 prevents the colors of incident lights from mingling. In addition, for example, a structure in which the straightness of light is physically enhanced may be adopted in order to prevent the colors of adjacent lights from mingling. Such a structure will be described by the use of FIGS. 12 and 13.

Figure 12:
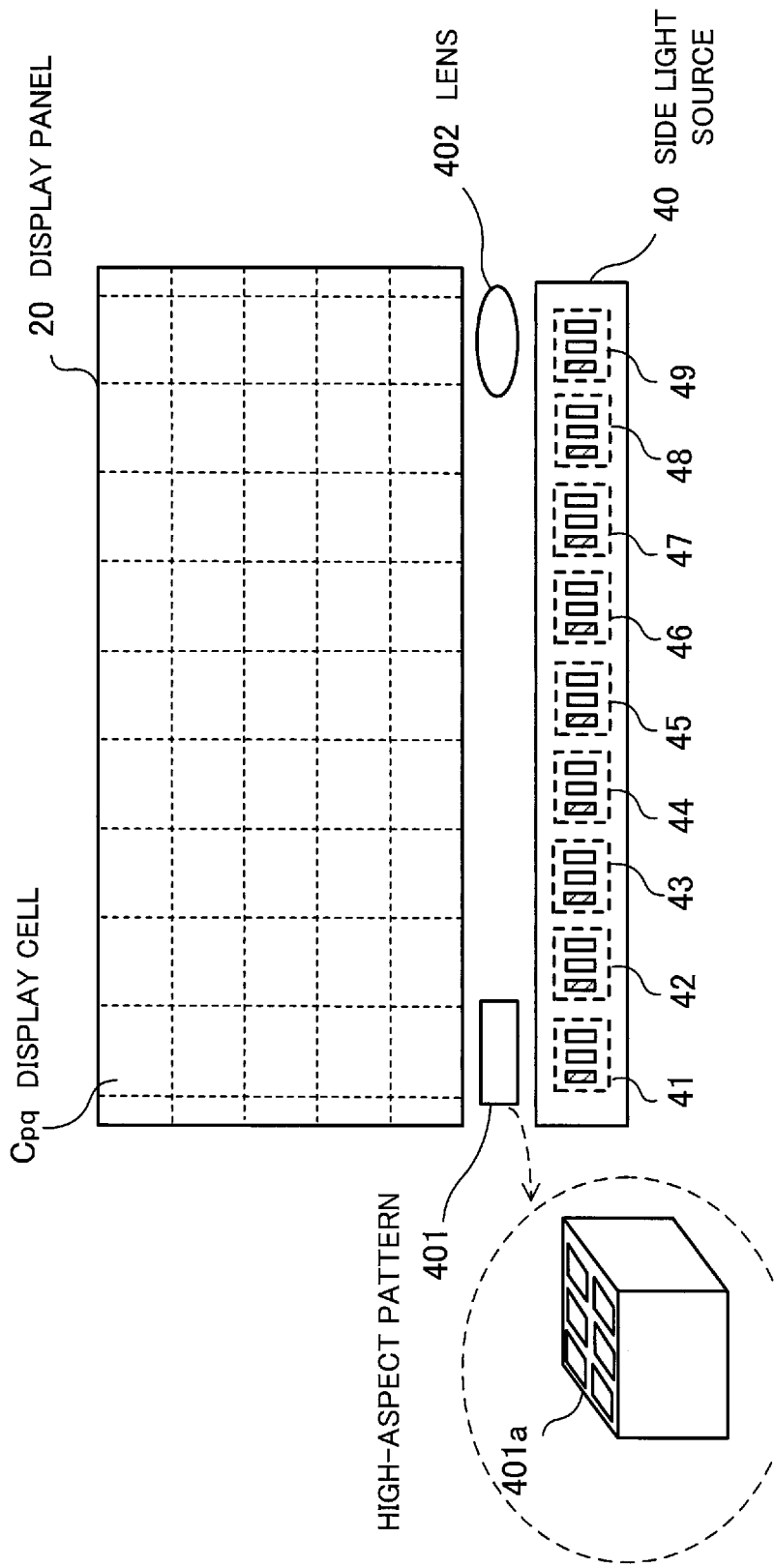
FIG. 12 illustrates an example of a structure in the second embodiment in which the straightness of incident light is enhanced.

FIG. 12 illustrates an example of a structure in the second embodiment in which the straightness of incident light is enhanced. With a structure illustrated in FIG. 12, an incident light diffusion preventing section which prevents light that is emitted from a side light source 40 and that enters a light modulation layer 80 from diffusing is disposed between the side light source 40 and a display panel 20 in order to enhance the straightness of incident light. A high-aspect pattern 401 or a lens 402 is disposed as an example of the incident light diffusion preventing section.

A resist pattern having a high aspect ratio is used for forming the high-aspect pattern 401. For example, the high-aspect pattern 401 has a shape in which a grid- or honeycomb-like light path runs. A high-aspect pattern 401a illustrated in FIG. 12 is an example of a grid-like high-aspect pattern 401. Incident light passes through the high-aspect pattern 401 disposed on an incident light path between the side light source 40 and the display panel 20. This prevents the incident light from diffusing.

The lens 402 converges incident light, which is emitted from the side light source 40 and enters the lens 402, and emits the converged incident light to the light modulation layer 80. By doing so, the straightness of the incident light is enhanced.

FIG. 13 illustrates another example of a structure in the second embodiment in which the straightness of incident light is enhanced. With the structure illustrated in FIG. 12, the incident light diffusion preventing section is disposed between the side light source 40 and the display panel 20. In FIG. 13, on the other hand, an in-layer light diffusion preventing member which prevents incident light from diffusing in a light modulation layer 80 is disposed. In FIG. 13, the light modulation layer 80 between a lower transparent substrate 22 and an upper transparent substrate 23 is not illustrated.

In order to enhance the straightness of incident light which enters the light modulation layer 80, in-layer light diffusion preventing members are formed on the lower transparent substrate 22 and the upper transparent substrate 23 in the direction in which the incident light travels. In the example of FIG. 13, a light guide pattern 24 is formed on the light modulation layer 80 side of the lower transparent substrate 22 of a display panel 20. Furthermore, a cylindrical pattern 25 is formed on the upper transparent substrate 23 on the opposite side of the light modulation layer 80. Both of the light guide pattern 24 and the cylindrical pattern 25 may be formed or only one of them may be formed.

The light guide pattern 24 is formed between adjacent display cells Cpq. For example, the light guide pattern 24 is formed between beltlike electrodes corresponding to adjacent display cells Cpq. Light which diffuses to the light guide pattern 24 side is reflected from the light guide pattern 24 and is returned to the center side. As a result, incident light which enters the light modulation layer 80 travels straight along a path formed by the light guide pattern 24.

The cylindrical pattern 25 is a cylindrical lens formed on the upper transparent substrate 23 as a pattern and condenses incident light on a straight line in the direction in which the cylindrical pattern 25 extends. This prevents incident light which enters the light modulation layer 80 from diffusing, and enhances the straightness of the incident light.

In addition, laser light having high straightness may be used as a light source of the side light source 40.

By physically enhancing the straightness of incident light in this way, a clear image in which colors do not mingle is also obtained.

Third Embodiment

A structure in which the display panel 20 in the second embodiment is provided in plurality and in which the display panels 20 are stacked will now be described as a third embodiment.

The number of the display panel 20 included in the above display device 10 is one. As stated above, however, the display panel 20 has high transparency. Therefore, even if plural display panels 20 are stacked, an observer visually recognizes the same display as with the structure in which one display panel 20 is used.

Figure 14:
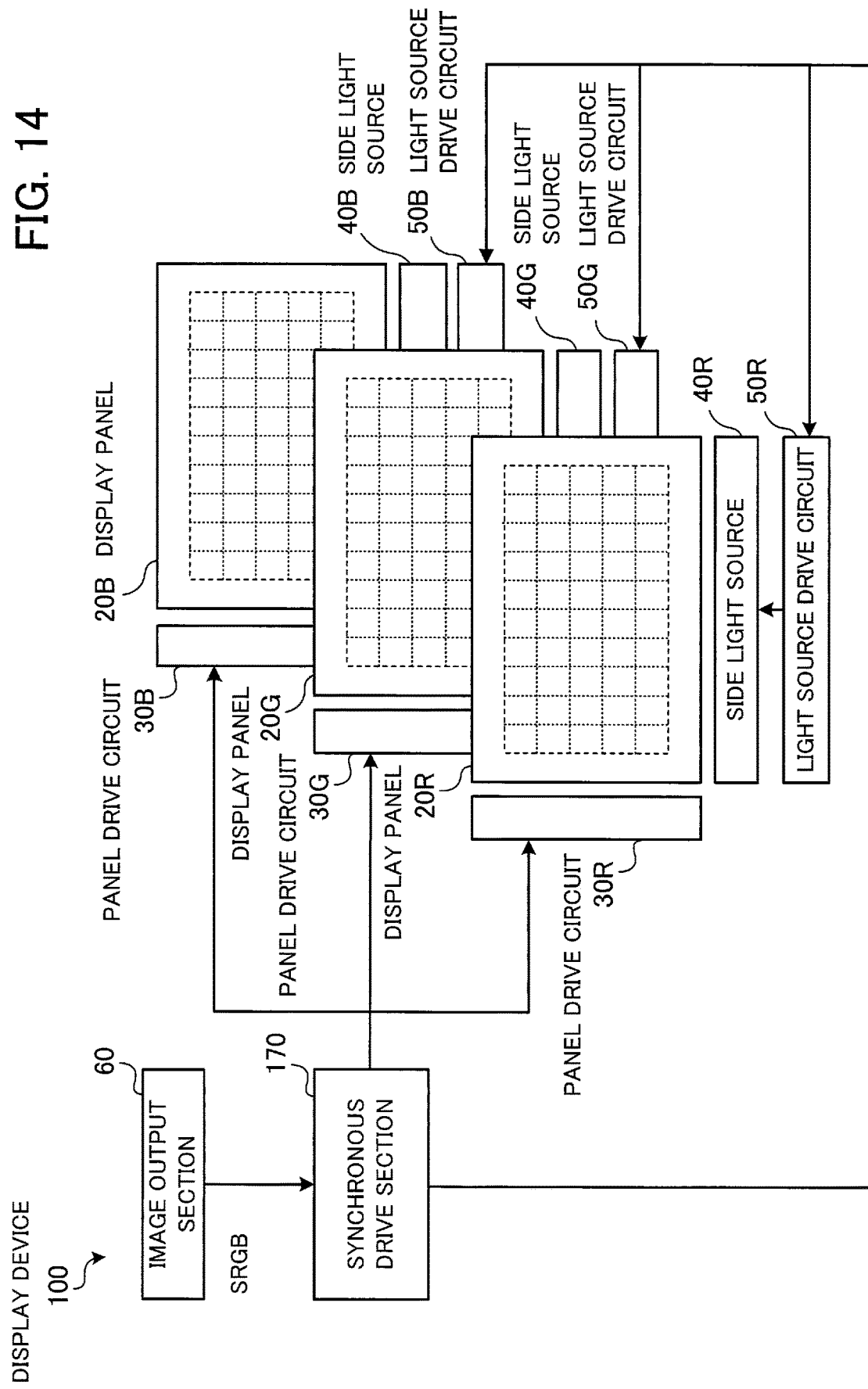
FIG. 14 illustrates an example of a structure according to a third embodiment in which plural display panels are stacked.

FIG. 14 illustrates an example of a structure according to a third embodiment in which plural display panels are stacked. Components which are the same as those included in the display device 10 illustrated in FIG. 2 are marked with the same numerals and their descriptions will be omitted.

A display device 100 includes an image output section 60, a synchronous drive section 170, display panels 20R, 20G, and 20B which form three layers, panel drive circuits 30R, 30G, and 30B corresponding to the display panels 20R, 20G, and 20B respectively, side light sources 40R, 40G, and 40B, and light source drive circuits 50R, 50G, and 50B corresponding to the side light sources 40R, 40G, and 40B respectively. In FIG. 14, the positions of the display panels 20R, 20G, and 20B are shifted for description. In reality, however, their display areas lie one upon another.

The display panels 20R, 20G, and 20B are the same as the display panel 20 illustrated in FIG. 2 and the panel drive circuits 30R, 30G, and 30B are the same as the panel drive circuit 30 illustrated in FIG. 2.

Each of the light source units 41 to 49 of the side light source 40 illustrated in FIG. 2 includes a red light source 4 nR, a green light source 4 nG, and a blue light source 4 nB. On the other hand, the side light sources 40R, 40G, and 40B emit monochromatic light to the corresponding display panels 20R, 20G, and 20B respectively. The side light source 40R includes only a red light source. The side light source 40G includes only a green light source. The side light source 40B includes only a blue light source. The light source drive circuits 50R, 50G, and 50B are the same as the light source drive circuit 50 illustrated in FIG. 2.

By adopting the above structure, the display panel 20R displays a signal value Rpq of a red component at a display cell Cpq in response to incident light emitted from the side light source 40R. The display panel 20G displays a signal value Gpq of a green component at a display cell Cpq in response to incident light emitted from the side light source 40G. Furthermore, the display panel 20B displays a signal value Bpq of a blue component at a display cell Cpq in response to incident light emitted from the side light source 40B. The display panels 20R, 20G, and 20B lie one upon another, so the observer visually recognizes display based on an image signal SRGB.

As stated above, a display cell Cpq emits light which enters from the back in a transparent state in which voltage is not applied to electrodes corresponding to the display cell Cpq. For example, if corresponding display cells Cpq of the display panels 20G and 20B are in a transparent state, then the observer visually recognizes light emitted from the display panel 20R.

Accordingly, the synchronous drive section 170 controls the panel drive circuits 30R, 30G, and 30B and the light source drive circuits 50R, 50G, and 50B so that scanning lines of the display panels 20R, 20G, and 20B will differ from one another. On the basis of an image signal SRGB inputted from the image output section 60, the synchronous drive section 170 generates a synchronization signal STM, a display cell drive signal SCEL, and a light source drive signal LRGB. The display cell drive signal SCEL and the light source drive signal LRGB are separated according to color components and are outputted to the corresponding panel drive circuits 30R, 30G, and 30B and light source drive circuits 50R, 50G, and 50B. The panel drive circuits 30R, 30G, and 30B are set in advance so that lines at which scanning starts will differ from one another. The synchronous drive section 170 adjusts a control signal according to a line at which scanning starts.

For example, if the panel drive circuits 30R, 30G, and 30B select rows of the display panels 20R, 20G, and 20B respectively, and scan display cells Cpq in order in the row direction (horizontal direction), then the panel drive circuits 30R, 30G, and 30B shift starting rows. The panel drive circuit 30R starts scanning from the first row, the panel drive circuit 30G starts scanning from the second row, and the panel drive circuit 30B starts scanning from the third row. The panel drive circuits 30R, 30G, and 30B perform scanning in synchronization with one another. Scanned rows of the display panels 20R, 20G, and 20B differ from one another. Accordingly, light emitted from, for example, the display panel 20G under the display panel 20R passes through the display panel 20R in which voltage is not applied to electrodes of a corresponding row, and is visually recognized by the observer. Similarly, light emitted from the display panel 20B under the display panels 20G and 20R passes through the display panels 20G and 20R and is visually recognized by the observer.

By adopting the above structure, the number of color light sources included in a side light source 40 for each display panel 20 is reduced. Accordingly, the display cells Cpq can be made small compared with a case where one display panel 20 is used. In addition, the panel drive circuits 30R, 30G, and 30B need only make the display panels 20R, 20G, and 20B display red, green, and blue respectively. This makes it possible to perform detailed display, compared with a case where one display panel 20 is used. Furthermore, if the size of the display cells Cpq is the same with a case where one display panel 20 is used, then an image is updated at a higher speed.

With the above structure three display panels 20 are stacked. However, the present disclosure is not limited to this structure. For example, two display panels 20 may be stacked. In this case, one display panel 20 is used for displaying red and the other display panel 20 is used for displaying blue and green. Furthermore, four display panels 20 may be stacked. In this case, these four display panels 20 are used for displaying, for example, red, green, blue, and white respectively. Plural display panels 20 to which side light sources 40 emit lights of the same colors may be stacked, of course.

Fourth Embodiment

A fourth embodiment will now be described.

A side light source is used as a light source in the second embodiment. In a fourth embodiment, however, an external light source is used as a light source.

Figure 15:
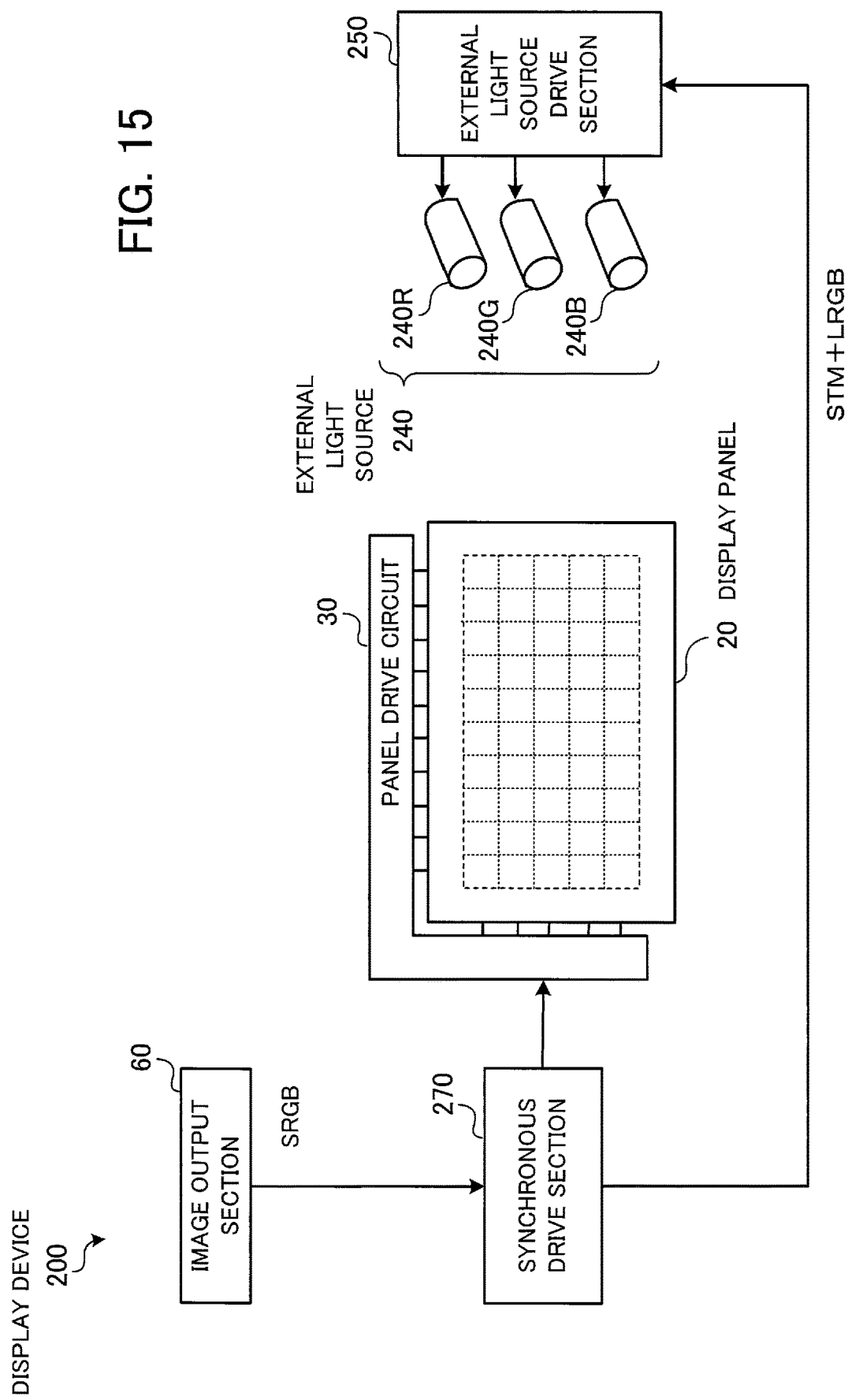
FIG. 15 illustrates an example of the structure of a display device according to a fourth embodiment.

FIG. 15 illustrates an example of the structure of a display device according to a fourth embodiment. Components which are the same as those included in the display device 10 illustrated in FIG. 2 are marked with the same numerals and their descriptions will be omitted.

A display device 200 includes a display panel 20, a panel drive circuit 30, an image output section 60, an external light source 240, an external light source drive section 250, and a synchronous drive section 270.

The display panel 20, the panel drive circuit 30, and the image output section 60 are the same as those in FIG. 2 which are marked with the same numerals.

The external light source 240 includes an external red light source 240R which emits red light, an external green light source 240G which emits green light, and an external blue light source 240B which emits blue light, is disposed outside the display panel 20, and emits light of each color to the display panel 20. The color of light emitted from each color light source included in the external light source 240 is not limited to the above colors. This is the same with the side light source 40. Furthermore, the external light source 240 may be disposed in any place as long as light emitted from the external light source 240 enters the display panel 20.

The external light source drive section 250 acquires a synchronization signal STM and a light source drive signal LRGB from the synchronous drive section 270 and drives the external light source 240.

The synchronous drive section 270 acquires an image signal SRGB from the image output section 60 and generates the synchronization signal STM for synchronizing the scanning of a display cell Cpq by the panel drive circuit 30 with the driving of the external light source 240 by the external light source drive section 250, a display cell drive signal SCEL, and the light source drive signal LRGB. The synchronization signal STM, the display cell drive signal SCEL, and the light source drive signal LRGB are the same as those indicated in FIG. 8.

For example, display performed on the basis of the field sequential control exercised in the display device 200 having the above structure will be described. Each time the panel drive circuit 30 completes the scanning of display cells Cpq of the display panel 20, the external light source drive section 250 switches a color light source of the external light source 240. The panel drive circuit 30 scans the display cells Cpq on the basis of signal values Rpq of red components at the timing at which the external light source drive section 250 drives the external red light source 240R. The same applies to the other colors. When voltage is applied to electrodes in a display cell Cpq, incident light emitted from the external light source 240 is scattered in a light modulation layer area corresponding to the display cell Cpq and is emitted from the display panel 20. When voltage is not applied to electrodes in a display cell Cpq, incident light emitted from the external light source 240 passes through a light modulation layer 80. As a result, an observer visually recognizes the transparent state of the display cell Cpq.

As has been described, even if the external light source 240 is used as a light source in place of the side light source 40, the synchronous drive section 270 can display an image on the display panel 20. This is the same with the side light source 40. That is to say, the synchronous drive section 270 controls the external light source drive section 250 and the panel drive circuit 30 and synchronizes the emission of light from the external light source 240 to a target display cell Cpq with the application of voltage to electrodes corresponding to the display cell Cpq. By doing so, the synchronous drive section 270 performs display.

Furthermore, as stated above, the side light source 40 and the external light source 240 are handled in the same way. Therefore, with the display device 200 the side light source 40 and the external light source 240 may mingle. For example, a light source unit including a red light source 4 nR and a green light source 4 nG may be disposed as the side light source 40 and the external blue light source 240B may be disposed as the external light source 240. In this case, a period for which the side light source 40 lights the blue light source 4 nB is replaced with a period for which the external blue light source 240B is lighted, for example, in the field sequential control illustrated in FIG. 10.

By replacing one color light source of the side light source 40 with the external light source 240 in this way, intervals at which color light sources are arranged in the side light source 40 are shortened and more detailed display is performed. As illustrated in FIG. 6, for example, the red light source 41R, the green light source 41G, and the blue light source 41B are arranged in the direction in which the display cells Cpq are arranged. If the number of the color light sources is reduced from three to two, then the width of each display cell Cpq in the direction of the side light source 40 is narrowed.

Furthermore, light emitted from the external light source 240 may enter one or more display panels 20 in the structure of FIG. 14 in which the plural display panels 20 are stacked.

The color of incident light emitted from the side light source 40 and the color of incident light emitted from the external light source 240 may be combined arbitrarily.

Fifth Embodiment

A fifth embodiment will now be described.

In the second embodiment incident light or emitted light is natural light. In a fifth embodiment, however, polarized light is used.

Figure 16:
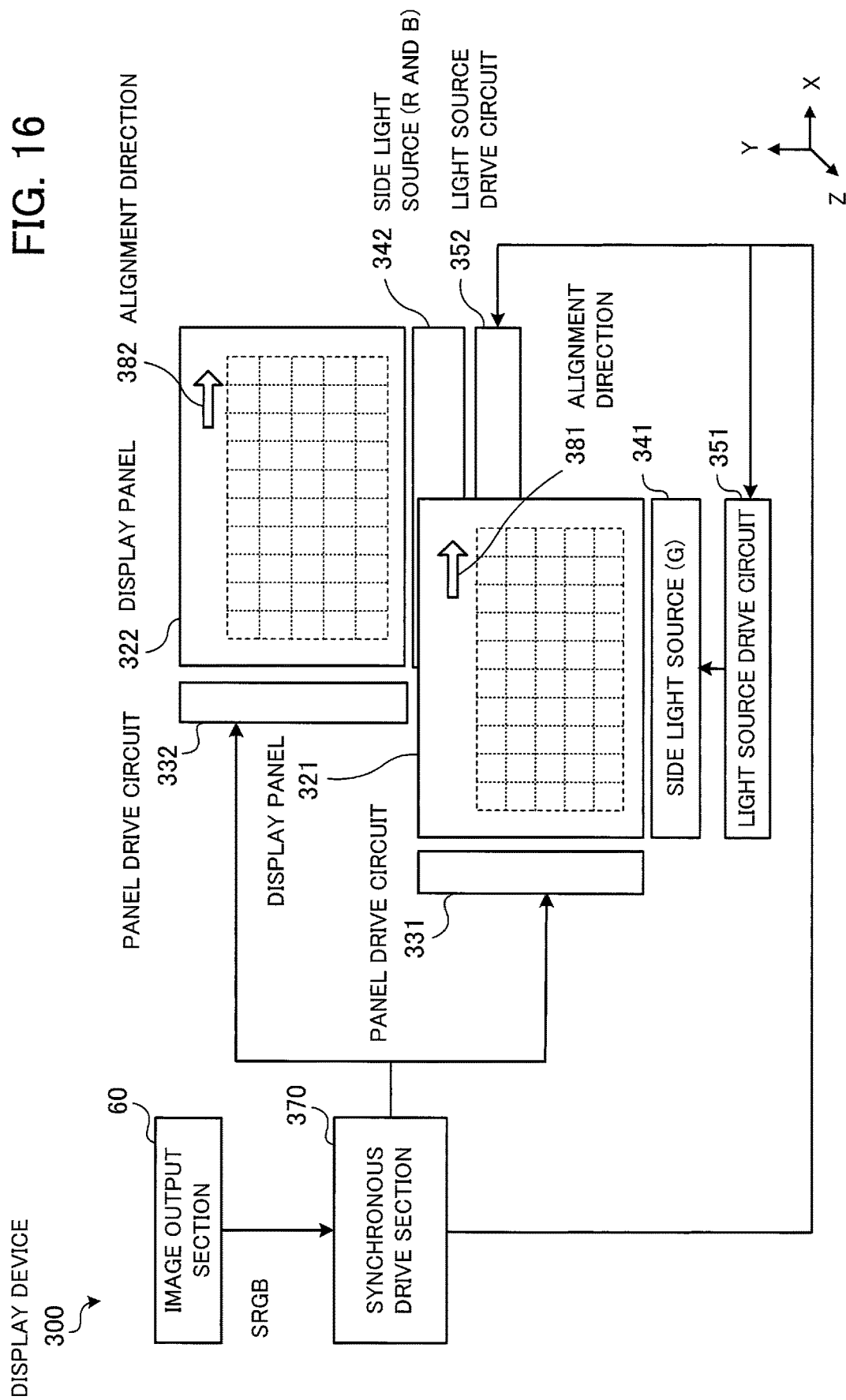
FIG. 16 illustrates an example of the structure of a display device according to a fifth embodiment.

FIG. 16 illustrates an example of the structure of a display device according to a fifth embodiment. Components which are the same as those included in the display device 10 illustrated in FIG. 2 are marked with the same numerals and their descriptions will be omitted.

A display device 300 includes an image output section 60, a synchronous drive section 370, display panels 321 and 322, panel drive circuits 331 and 332, a side light source (G) 341, a side light source (R and B) 342, and light source drive circuits 351 and 352. In FIG. 16, the positions of the display panels 321 and 322 are shifted for description. In reality, however, their display areas lie one upon the other.

The structure of the display panel 321 is the same as that of the display panel 20 illustrated in FIG. 3A. The panel drive circuit 331 applies voltage corresponding to color information to electrodes corresponding to a display cell Cpq. As a result, an electric field is generated in a corresponding light modulation layer area. In addition, light emitted from the side light source (G) 341 enters a light modulation layer 80. In the example of FIG. 16, the side light source (G) 341 includes only a green light source which emits green light. The display panel 321 differs from the display panels 20 illustrated in FIG. 3A in that it is aligned in an alignment direction 381 indicated in FIG. 16 by an alignment process (such as a rubbing process or an optical alignment process).

The structure of the display panel 322 is the same as that of the display panel 321. The panel drive circuit 332 drives electrodes corresponding to a display cell Cpq. As a result, an electric field is generated in a corresponding light modulation layer area. In addition, light emitted from the side light source (R and B) 342 enters the light modulation layer area. The side light source (R and B) 342 includes a red light source which emits red light (R) and a blue light source (B) which emits blue light. The display panel 322 is aligned in an alignment direction 382 indicated in FIG. 16 by an alignment process. This is the same with the display panel 321.

The synchronous drive section 370 acquires an image signal SRGB from the image output section 60, synchronizes and drives the panel drive circuit 331 and the light source drive circuit 351, and synchronizes and drives the panel drive circuit 332 and the light source drive circuit 352. The synchronous drive section 370 synchronizes the emission of light to a target display cell Cpq by the light source drive circuit 351 with the application of voltage to corresponding electrodes by the panel drive circuit 331. The same applies to the panel drive circuit 332 and the light source drive circuit 352. On the other hand, the display panels 321 and 322 need only be equal in timing of at least one image frame cycle. Unlike the case of FIG. 14 in which the plural display panels 20 are stacked, there is no need to exactly synchronize the display panels 321 and 322. Details will be described later.

The alignment of the display panels 321 and 322 will now be described.

In the example of FIG. 16, the alignment directions 381 and 382 are the horizontal directions of the light modulation layer 80. It is assumed that the display panels 321 and 322 are aligned by, for example, an alignment process. In this case, a liquid crystalline monomer 81 in the light modulation layer 80 is aligned in the longitudinal direction of a striped structure. If an electric field is generated in this state, liquid crystal molecules 82 tend to tilt in the longitudinal direction of the striped structure. Accordingly, on the whole, the tilt direction of the liquid crystal molecules 82 matches the alignment direction.

With the display panel 321 or 322 in the fifth embodiment the panel drive circuit 331 or 332 applies voltage to electrodes. When an electric field is generated in a light modulation layer area, the tilt directions of the liquid crystal molecules 82 in the light modulation layer area match. As a result, polarized light components which are equal in polarization direction are emitted from the light modulation layer area. In the example of FIG. 16, the alignment directions 381 and 382 of the stacked display panels 321 and 322 are the same and light polarized in the same direction as the alignment direction is emitted from each of the display panels 321 and 322.

Furthermore, light emitted from the display panel 322 on the back side of the display panel 321 enters the display panel 321. The light modulation layer 80 of the display panel 321 is also aligned in the same alignment direction 381. Accordingly, if the light which enters the display panel 321 from the back is polarized in the same direction as the alignment direction 381, then the light passes through the light modulation layer 80. Even if an electric field is generated in the light modulation layer 80, the light passes through the light modulation layer 80.

As has been described, by using polarized light in the display device 300 in which the display panels 321 and 322 are stacked, an observer on the display panel 321 side visually recognizes light emitted from both of the display panels 321 and 322.

In the above example, the display panels 321 and 322 are aligned horizontally. However, the present disclosure is not limited to the horizontal alignment. Representative alignment modes are of two types: horizontal alignment and vertical alignment. However, any alignment mode may be used as long as the tilt directions of liquid crystal molecules match at the time of voltage being applied to electrodes. With the horizontal alignment mode, as illustrated in FIG. 16, an alignment process is performed on the display panels 321 and 322. The display panels 321 and 322 are then stacked so that their alignment directions will be the same. With the vertical alignment mode, an alignment film which forms a pre-tilt angle, patterned vertical alignment (PVA) which controls a tilt direction by a fringe electric field generated between minute electrodes, multi-domain vertical alignment (MVA) in which a resin tape pattern is formed, or the like is known.

The display function of the display device 300 will now be described.

With the display device 300 the side light source (R and B) 342 emits incident light to a side of the light modulation layer 80 of the display panel 322. This incident light is natural light and is not polarized. When voltage is applied to electrodes corresponding to a display cell Cpq which the incident light enters and an electric field is generated in a light modulation layer area of the display cell Cpq, the incident light is scattered. Scattered light is polarized in the alignment direction of the liquid crystalline monomer 81, that is to say, in the direction of stripes of the liquid crystalline monomer 81 and is emitted from the display panel 322 as emitted light.

Figure 17A:
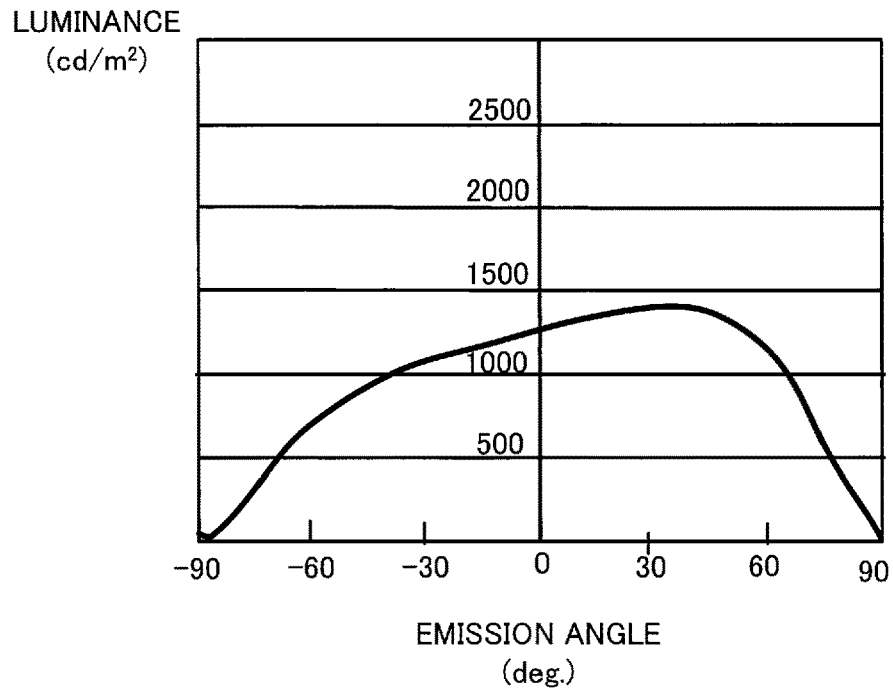
FIGS. 17A and 17B illustrate an example of the amount of emitted polarized light in the fifth embodiment.
Figure 17B:
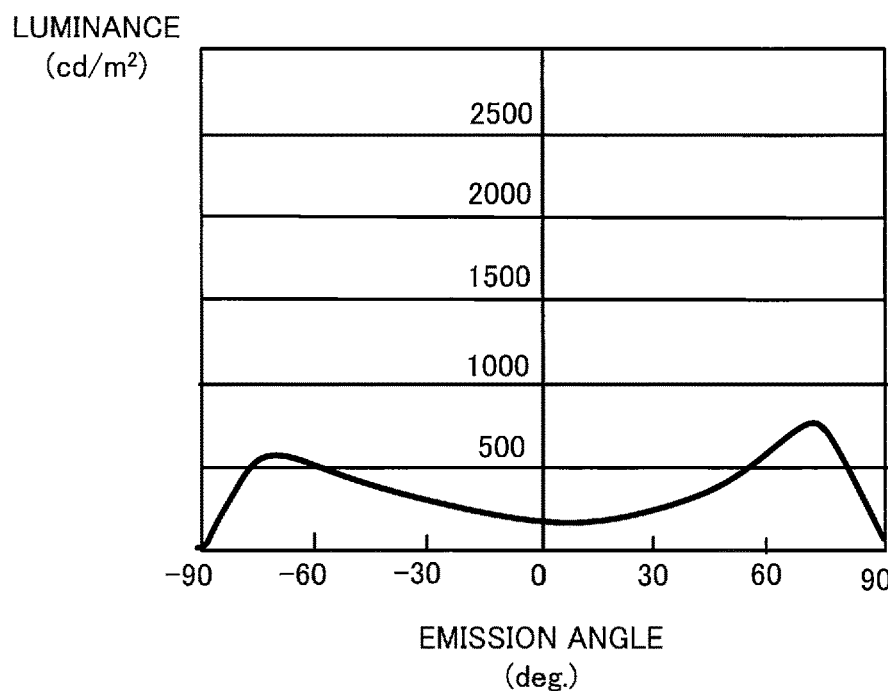

FIGS. 17A and 17B illustrate an example of the amount of emitted polarized light in the fifth embodiment.

FIG. 17A indicates the amount of polarized light which is emitted from the display panels 321 and 322 and which is polarized in the direction of the stripes of the liquid crystalline monomer 81, that is to say, in a direction which matches the alignment direction of the liquid crystalline monomer 81. FIG. 17A indicates that a large amount of light which is polarized in a direction that matches the alignment direction is emitted.

FIG. 17B indicates the amount of polarized light which is emitted from the display panels 321 and 322 and which is polarized in a direction perpendicular to the direction of the stripes. FIG. 17B indicates that a small amount of light which is polarized in a direction perpendicular to the alignment direction is emitted.

Light emitted from the display panels 321 and 322 is polarized in this way in the alignment direction. Light emitted from the display panel 322 on the back side of the display panel 321 enters the display panel 321. The operation of the display panel 321 at this time will be described.

Figure 18:
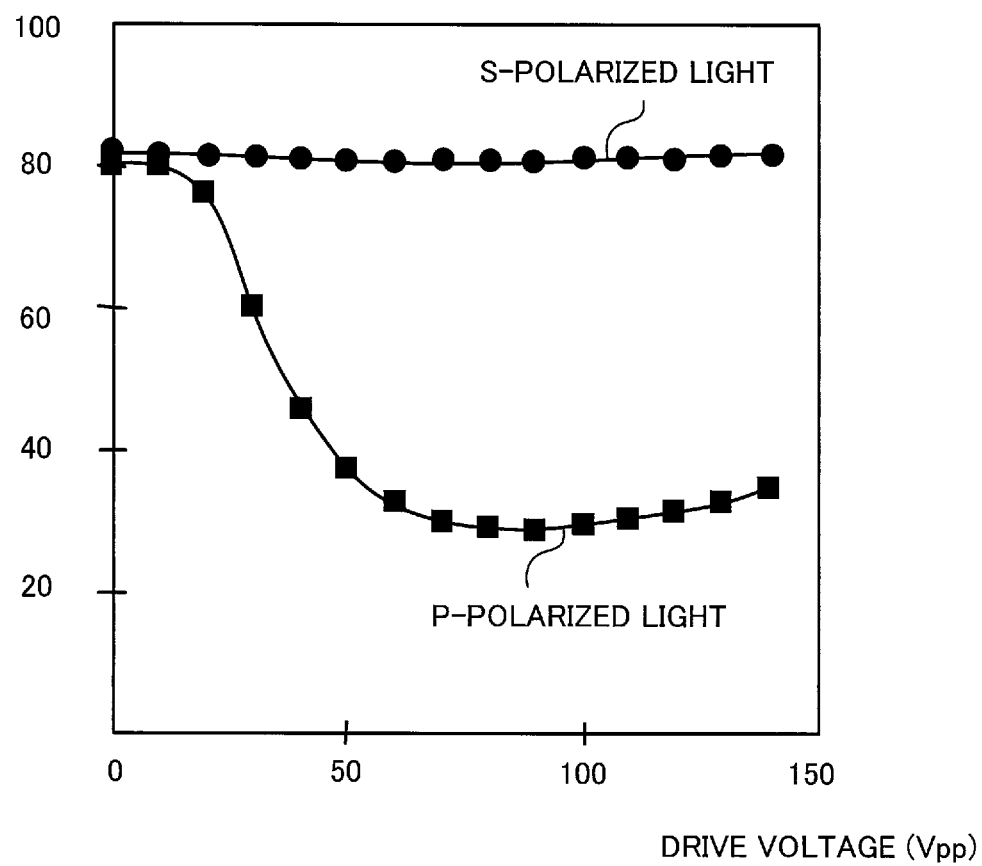
FIG. 18 illustrates an example of the relationship between the transmissivity of light which enters from a back and drive voltage according to polarization directions in the fifth embodiment.

FIG. 18 illustrates an example of the relationship between the transmissivity of light which enters from the back and drive voltage according to polarization directions in the fifth embodiment. S-Polarized Light indicates transmissivity obtained in the case of the polarization direction of incident light matching the direction of the stripes of the liquid crystalline monomer 81 (alignment direction). P-Polarized Light indicates transmissivity obtained in the case of the polarization direction of incident light being perpendicular to the direction of the stripes of the liquid crystalline monomer 81. Drive voltage is voltage applied to electrodes by which an electric field is generated in the light modulation layer 80.

As can be seen from FIG. 18, in a state in which drive voltage is approximately zero and an electric field is not generated in the light modulation layer 80, both of incident light polarized in a direction which matches the alignment direction (s-polarized light) and incident light polarized in a direction perpendicular to the alignment direction (p-polarized light) pass through the light modulation layer 80 and are emitted from the display panels 321 and 322. When drive voltage is applied to electrodes and the light modulation layer 80 is in a scattering state, incident light polarized in a direction perpendicular to the alignment direction (p-polarized light) is scattered in the light modulation layer 80 and hardly passes through the light modulation layer 80. On the other hand, incident light polarized in a direction which matches the alignment direction (s-polarized light) is not scattered in the light modulation layer 80 and passes through the light modulation layer 80.

Display control exercised in the display device 300 having the above structure will now be described. With the display device 100 according to the third embodiment illustrated in FIG. 14, the display panels 20R, 20G, and 20B are stacked. In order to make the display panel 20R transmit light emitted from the display panel 20B or 20G under the display panel 20R, there is a need to shift scanning lines of the display panels 20R, 20G, and 20B. With the display device 300, however, there is no need to shift scanning lines.

Figure 19:
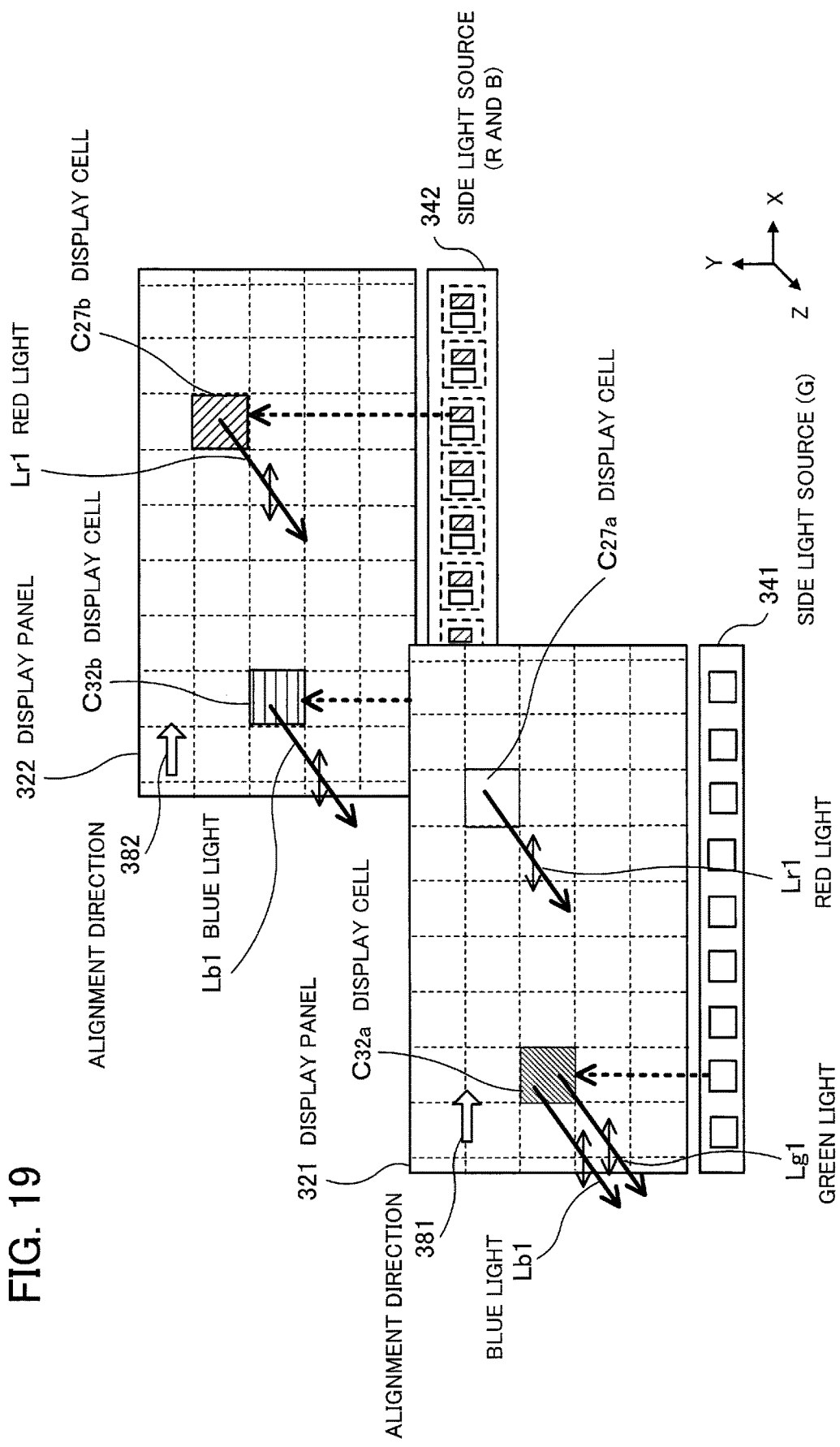
FIG. 19 illustrates an example of display control in the display device according to the fifth embodiment.

FIG. 19 illustrates an example of display control in the display device according to the fifth embodiment. The panel drive circuits 331 and 332 and the light source drive circuits 351 and 352 are not illustrated in FIG. 19.

With the display device 300 the synchronous drive section 370 synchronizes and drives the panel drive circuit 331 and the side light source (G) 341 and synchronizes and drives the panel drive circuit 332 and the side light source (R and B) 342. A case where scanning lines of the upper display panel 321 and the lower display panel 322 are the same and where display cells Cpq of the display panels 321 and 322 which lie one upon the other are synchronized and driven will be described.

First a case where a display cell C27a of the display panel 321 and a display cell C27b of the display panel 322 which lies upon the display cell C27a are synchronized and driven will be described as an example. On the basis of a red component R27 contained in an image signal SRGB, red light emitted from the side light source (R and B) 342 enters the display cell C27b of the lower display panel 322 and voltage is applied to electrodes corresponding to the display cell C27b. As a result, the red light which enters the display cell C27b is scattered in a light modulation layer area of the display cell C27b and red light Lr1 is emitted. The red light Lr1 is polarized in the same direction (X direction in FIG. 19) as the alignment direction 382 of the display panel 322. The red light Lr1 enters the display cell C27a of the upper display panel 321 from the back. In the example of FIG. 19, voltage is not applied to electrodes corresponding to the display cell C27a, and the red light Lr1 which enters the display cell C27a passes through the display cell C27a. As a result, the observer visually recognizes the red light Lr1 emitted from the lower display cell C27b.

Next, a case where a display cell C32a of the display panel 321 and a display cell C32b of the display panel 322 which lies upon the display cell C32a are synchronized and driven will be described. Blue light emitted from the side light source (R and B) 342 enters the display cell C32b of the lower display panel 322 and voltage is applied to electrodes corresponding to the display cell C32b. The blue light which enters the display cell C32b is scattered in a light modulation layer area of the display cell C32b and blue light Lb1 is emitted. The blue light Lb1 is polarized in the same direction (X direction in FIG. 19) as the alignment direction 382 of the display panel 322. The blue light Lb1 enters the display cell C32a of the upper display panel 321 from the back. As indicated in FIG. 18, the light modulation layer 80 of the display device 300 transmits light polarized in the same direction as the alignment direction 381, so the blue light Lb1 passes through the display cell C32a. Furthermore, in the example of FIG. 19, green light emitted from the side light source (G) 341 enters the display cell C32a and voltage is applied to electrodes corresponding to the display cell C32a. The display cell C32a scatters the green light and emits green light Lg1. The green light Lg1 is also polarized in the same direction (X direction in FIG. 19) as the alignment direction 381. In this way, the display cell C32a transmits and emits the blue light Lb1 which is emitted from the display panel 322, and emits the green light Lg1 which is generated by scattering the green light emitted from the side light source (G) 341. As a result, the observer visually recognizes the blue light Lb1 and the green light Lg1.

As has been described, with the display device 300 the upper display panel 321 transmits light which is emitted from the lower display panel 322, which enters the upper display panel 321 from the back, and which is polarized in the same direction as the alignment direction. In addition, the upper display panel 322 scatters and emits light emitted from the side light source (G) 341. As a result, an image based on one image signal SRGB is displayed by the stacked display panels 321 and 322. The processing of colors is divided among plural display panels, so the number of lines which can be driven is increased. In addition, display gives a feeling of depth.

FIG. 19 illustrates the structure in which the two display panels 321 and 322 are stacked. However, if display panels which are equal in structure to the display panels 321 and 322 are disposed so that their alignment directions will match, any number of display panels may be stacked. As described by the use of FIGS. 3A, 3B, and 3C and FIGS. 4A and 4B, the light modulation layer 80 of the display device 300 has high transparency in a state in which an electric field is not generated. Furthermore, as indicated in FIG. 18, the light modulation layer 80 has high transmissivity to light which enters from the back and which is polarized in the same direction as the alignment direction. Accordingly, even if plural display panels are stacked, high transparency and clear display are realized.

Furthermore, with the display device 300 the side light sources 341 and 342 are used as light sources which emit light to be scattered in a display cell Cpq. However, the external light source 240 illustrated in FIG. 15 may be used. It is assumed that the external light source 240 emits light which is not polarized. If the external light source 240 is used, the display panels 321 and 322 emit the same light as with a case where the side light sources 341 and 342 are used. That is to say, when voltage is applied to electrodes corresponding to a target display cell Cpq, liquid crystal molecules 82 in a light modulation layer area of the display cell Cpq tilt in an alignment direction. As a result, incident light emitted from the external light source 240 is scattered and scattered light is emitted as light polarized in the alignment direction.

The side light sources 341 and 342 and the external light source 240 are driven in the same way. Accordingly, with the display device 300 the external light source 240 and the side light sources 341 and 342 may mingle.

As has been described, scattering and transmission occur at the same time in a display cell Cpq of the display panel 321 by the use of polarized light. That is to say, in a state in which voltage is applied to electrodes corresponding to the display cell Cpq, switching between the transmission and scattering of light which enters the light modulation layer 80 from the front or back is performed according to a polarization plane of the light. In addition to switching between a scattering state and a transmission state described by the use of FIGS. 2 through 15, display control is exercised by the use of polarized light. As a result, there are many display variations.

Embodiments in which an aligned display panel in which the tilt directions of liquid crystal molecules match at the time of voltage being applied is used will now be described by the use of FIGS. 20A and 20B, 21, 22, and 23. The lighting of a light source, such as a side light source or an external light source, is synchronized with the application of voltage to electrodes corresponding to a display cell Cpq. This is the same in the following embodiments, so description of synchronous drive will be omitted in the following embodiments.

Sixth Embodiment

A sixth embodiment will now be described.

In the fifth embodiment the structure in which plural display panels aligned in the same direction are stacked is described. In a sixth embodiment, however, one display panel is used. In the fifth embodiment light emitted from the side light source 341 or 342 is natural light and is not polarized. In a sixth embodiment, however, polarized light enters.

Figure 20A:
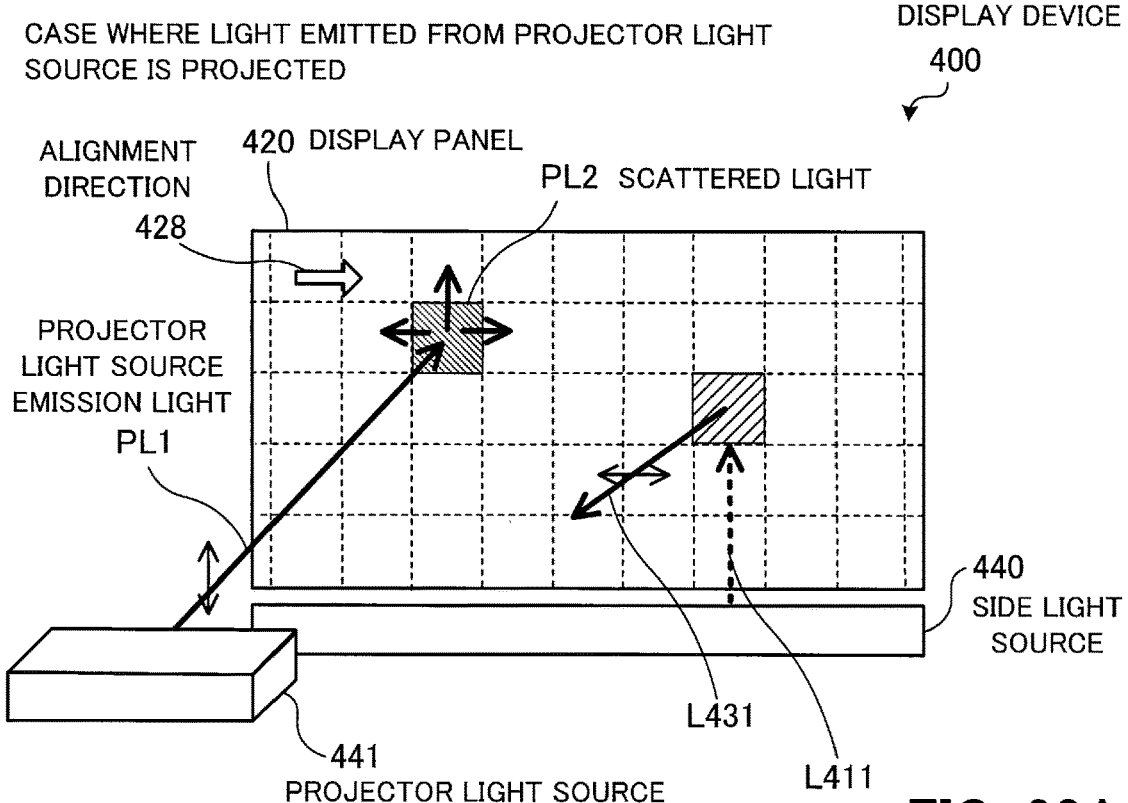
FIGS. 20A and 20B illustrate an example of the structure of a display device according to a sixth embodiment.
Figure 20B:
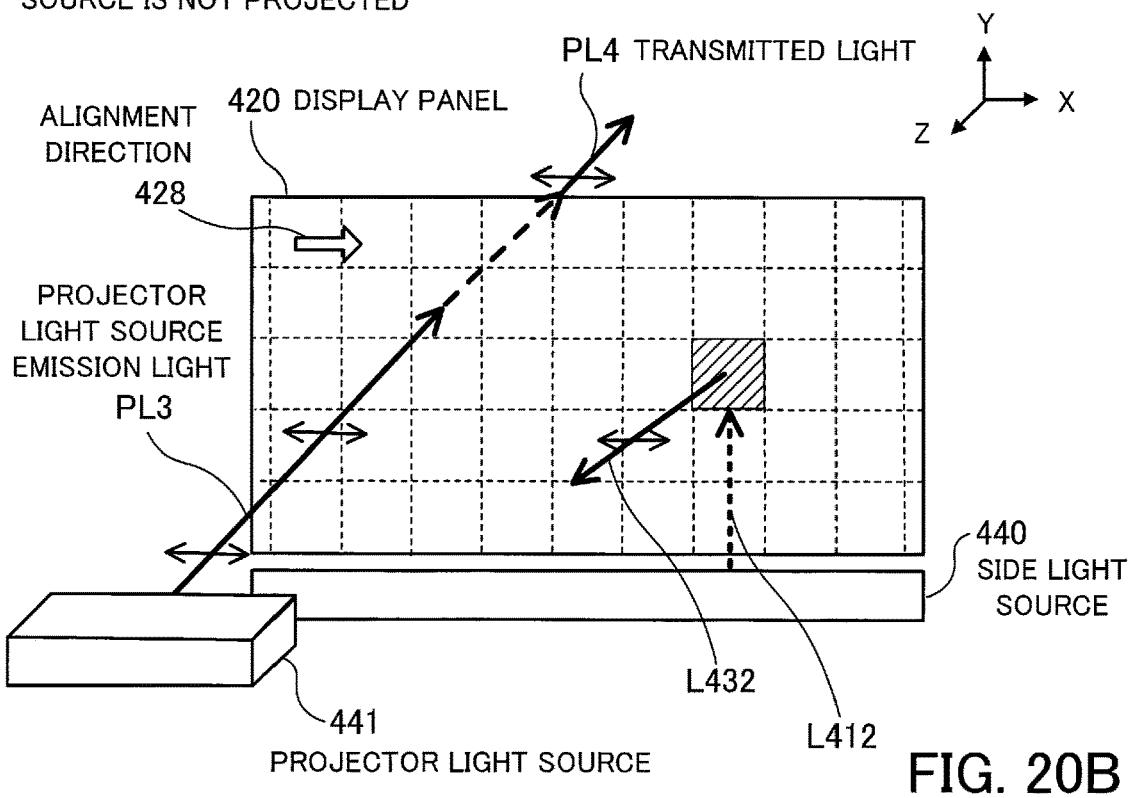

FIGS. 20A and 20B illustrate an example of the structure of a display device according to a sixth embodiment. FIG. 20A illustrates a case where light emitted from a projector light source is projected and FIG. 20B illustrates a case where light emitted from the projector light source is not projected.

A display device 400 includes a display panel 420, a side light source 440, and a projector light source 441 which is an external light source. The display panel 420 includes a light modulation layer 80 and is processed so that an alignment direction 428 will be a horizontal direction (X direction) in FIG. 20A or 20B. Light of a determined color emitted from the side light source 440 enters the display panel 420 from a side.

The projector light source 441 emits light to the light modulation layer 80 of the display panel 420 from the outside. By combining light of a color emitted from the projector light source 441 and light of a color emitted from the side light source 440, an image based on an image signal SRGB is displayed. The projector light source 441 emits light polarized in a selected direction. In the example of FIG. 20A or 20B, projector light source emission light PL1 polarized in a direction perpendicular to the alignment direction 428, which is the horizontal direction, or projector light source emission light PL3 polarized in a direction parallel to the alignment direction 428 is selected.

FIG. 20A illustrates a case where the projector light source 441 emits to the display panel 420 the projector light source emission light PL1 polarized in the direction perpendicular to the alignment direction 428. Voltage is applied to electrodes corresponding to a display cell Cpq of the display panel 420 which the projector light source emission light PL1 enters, and an electric field is generated. A light modulation layer area of the display cell Cpq transmits light which enters from the back and which is polarized in a direction parallel to the alignment direction 428. On the other hand, the light modulation layer area of the display cell Cpq scatters light which is polarized in a direction perpendicular to the alignment direction 428. The projector light source emission light PL1 is polarized in the direction perpendicular to the alignment direction 428, so the projector light source emission light PL1 is scattered in the light modulation layer area of the display cell Cpq. As a result, scattered light PL2 is emitted to the outside and is visually recognized by an observer. That is to say, light emitted from the projector light source 441 is projected on the display panel 420.

On the other hand, FIG. 20B illustrates a case where the projector light source 441 emits to the display panel 420 the projector light source emission light PL3 polarized in the direction parallel to the alignment direction 428. Voltage is applied to electrodes corresponding to a display cell Cpq of the display panel 420 which the projector light source emission light PL3 enters, and an electric field is generated. This is the same with the case of FIG. 20A. The projector light source emission light PL3 is polarized in the direction parallel to the alignment direction 428, so a light modulation layer area of the display cell Cpq transmits the projector light source emission light PL3. As a result, transmitted light PL4 is emitted. That is to say, light emitted from the projector light source 441 is not projected on the display panel 420.

As has been described, with the display device 400 the tilt directions of liquid crystal molecules 82 match when the light modulation layer 80 of the display panel 420 is aligned in a determined direction and voltage is applied to electrodes. Accordingly, in a state in which voltage is applied to electrodes corresponding to a target display cell Cpq, a direction in which light that enters the display cell Cpq and that is emitted from the projector light source 441 is polarized is controlled. This makes it possible to perform switching between a transmission state and a display state. In the example of FIG. 20A or 20B, if incident light emitted from the projector light source 441 is polarized in the direction perpendicular to the alignment direction 428, then the incident light is scattered and the scattered light PL2 is emitted. If incident light emitted from the projector light source 441 is polarized in the direction parallel to the alignment direction 428, then the incident light passes through a light modulation layer area of the display cell Cpq.

Seventh Embodiment

A seventh embodiment will now be described.

Figure 21:
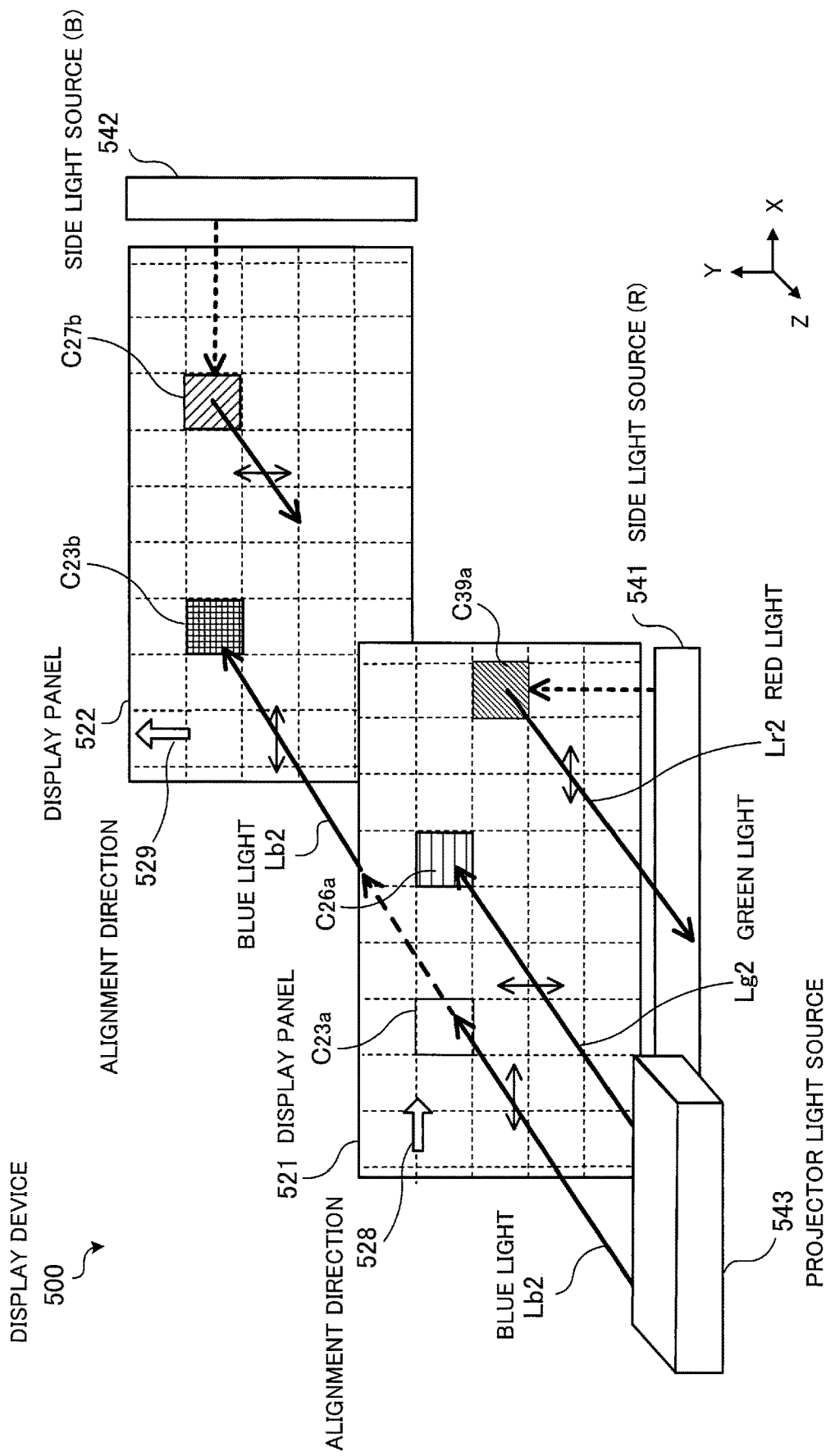
FIG. 21 illustrates an example of the structure of a display device according to a seventh embodiment.

In the sixth embodiment the structure in which one display panel and a projector light source are used is described. In a seventh embodiment, however, a structure in which two display panels are used and in which a projector light source is used as a light source will be described. FIG. 21 illustrates an example of the structure of a display device according to a seventh embodiment. The planes of display panels 521 and 522 lie one upon the other. This is the same with the fifth embodiment.

A display device 500 includes a display panel 521, a side light source (R) 541, a display panel 522, a side light source (B) 542, and a projector light source 543.

The display panel 521 includes a light modulation layer 80 and an alignment direction 528 is a horizontal direction (X direction) in FIG. 21. The side light source (R) 541 is disposed along a side of the display panel 521.

The display panel 522 includes a light modulation layer 80 and an alignment direction 529 is a vertical direction (Y direction) perpendicular to the alignment direction 528 of the display panel 521. The side light source (B) 542 is disposed along a side of the display panel 522 in a direction perpendicular to the side light source (R) 541.

From the viewpoint of the emission of polarized light or efficiency in taking out light, it is desirable that the length direction of a side light source and an alignment direction be the same. Accordingly, the side light source (B) 542 differs from the side light source (R) 541 in position.

The projector light source 543 emits blue light Lb2 and green light Lg2 to the display panel 521. In the example of FIG. 21, the blue light Lb2 emitted from the projector light source 543 is polarized in the horizontal direction (X direction) in FIG. 21. The polarization direction of the blue light Lb2 is parallel to the alignment direction 528 of the display panel 521 and is perpendicular to the alignment direction 529 of the display panel 522. The green light Lg2 is polarized in the vertical direction (Y direction). The polarization direction of the green light Lg2 is perpendicular to the alignment direction 528 of the display panel 521 and is parallel to the alignment direction 529 of the display panel 522.

Light emitted from the side light source (R) 541 enters the display panel 521 of the above display device 500. When voltage is applied to electrodes corresponding to a target display cell C39a, the light is scattered in the display cell C39a and red light Lr2 is emitted. The red light Lr2 is polarized in the same direction as the alignment direction 528. The polarization direction of the green light Lg2 emitted from the projector light source 543 to the display panel 521 is perpendicular to the alignment direction 528. Accordingly, when voltage is applied to electrodes corresponding to a target display cell C26a, the green light Lg2 is scattered. On the other hand, the polarization direction of the blue light Lb2 is the same as the alignment direction 528. Accordingly, even when voltage is applied to electrodes corresponding to a target display cell C23a, the blue light Lb2 passes through the display cell C23a and enters the display panel 522.

The polarization direction of the blue light Lb2 which passes through the display panel 521 and which enters the display panel 522 is perpendicular to the alignment direction 529 of the display panel 522, so the blue light Lb2 is scattered in the display panel 522.

The upper display panel 521 performs display like the display cell C26a or the upper display panel 521 performs transmission like the display cell C23a and the lower display panel 522 performs display like a display cell C23b, according to the polarization direction of light emitted from the projector light source 543.

Furthermore, if the polarization direction of light emitted from the projector light source 543 is switched, that is to say, if the polarization direction of the blue light Lb2 is perpendicular to the alignment direction 528 of the upper display panel 521 and the polarization direction of the green light Lg2 is parallel to the alignment direction 528 of the upper display panel 521, then display is reversed. As has been described, by making the alignment direction 528 of the upper display panel 521 perpendicular to the alignment direction 529 of the lower display panel 522 and switching the polarization direction of light emitted from the projector light source 543, the display panels 521 and 522 display different images. The polarization direction of light emitted from the projector light source 543 is realized by disposing between the projector light source 543 and the display panel 521 an element which rotates a polarization direction. The projector light source 543 may have such a function.

With the structure illustrated in FIG. 21, the alignment direction of the upper display panel 521 is perpendicular to the alignment direction of the lower display panel 522. However, an alignment direction of an upper display panel and an alignment direction of a lower display panel may be the same. In this case, a layer which changes a polarization plane is disposed between them.

Figure 22:
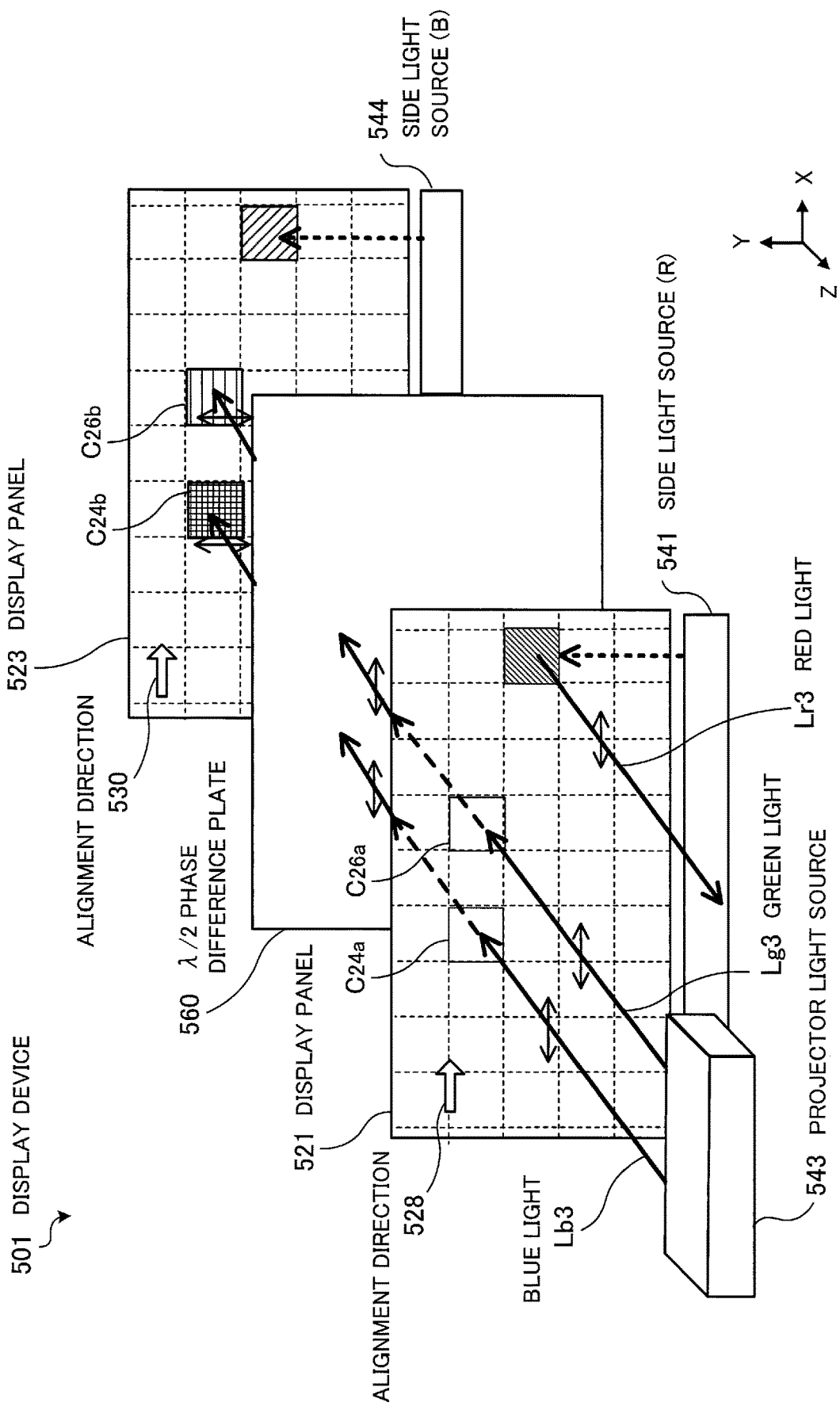
FIG. 22 illustrates a first modification of the display device according to the seventh embodiment.

FIG. 22 illustrates a first modification of the display device according to the seventh embodiment. Components which are the same as those illustrated in FIG. 21 are marked with the same numerals and their descriptions will be omitted.

A display device 501 has a structure in which a λ/2 phase difference plate 560 is disposed between stacked display panels 521 and 523. The planes of the display panels 521 and 523 lie one upon the other.

The display panel 521, a side light source (R) 541, and a projector light source 543 are the same as the display panel 521, the side light source (R) 541, and the projector light source 543, respectively, illustrated in FIG. 21.

The display panel 523 differs from the display panel 522 in that an alignment direction 530 is a horizontal direction (X direction), that is to say, is the same as an alignment direction 528 of the display panel 521 and in that a side light source (B) 544 differs from the side light source (B) 542 in position. The display panel 523 is the same as the display panel 522 in the other respects.

The λ/2 phase difference plate 560 is disposed between the display panels 521 and 523 and changes the polarization plane of transmitted light.

A case where blue light Lb3 and green light Lg3 whose polarization directions are the same as the alignment direction 528 of the display panel 521 are emitted from the projector light source 543 to the display panel 521 in the display device 501 having the above structure will be described.

The polarization directions of the blue light Lb3 and the green light Lg3 are the same as the alignment direction 528 of the display panel 521, so the blue light Lb3 and the green light Lg3 pass through the display panel 521 and enters the λ/2 phase difference plate 560. The blue light Lb3 and the green light Lg3 pass through target display cells C24a and C26a, respectively, not only in a state in which voltage is not applied to electrodes corresponding to the display cells C24a and C26a but also in a state in which voltage is applied to the electrodes corresponding to the display cells C24a and C26a. The polarization planes of the blue light Lb3 and the green light Lg3 which has passed through the λ/2 phase difference plate 560 change. That is to say, the polarization planes of the blue light Lb3 and the green light Lg3 are perpendicular to the alignment direction 530 of the display panel 523. When voltage is applied to electrodes corresponding to target display cells C24b and C26b of the display panel 523, the blue light Lb3 and the green light Lg3 are scattered.

Figure 23:
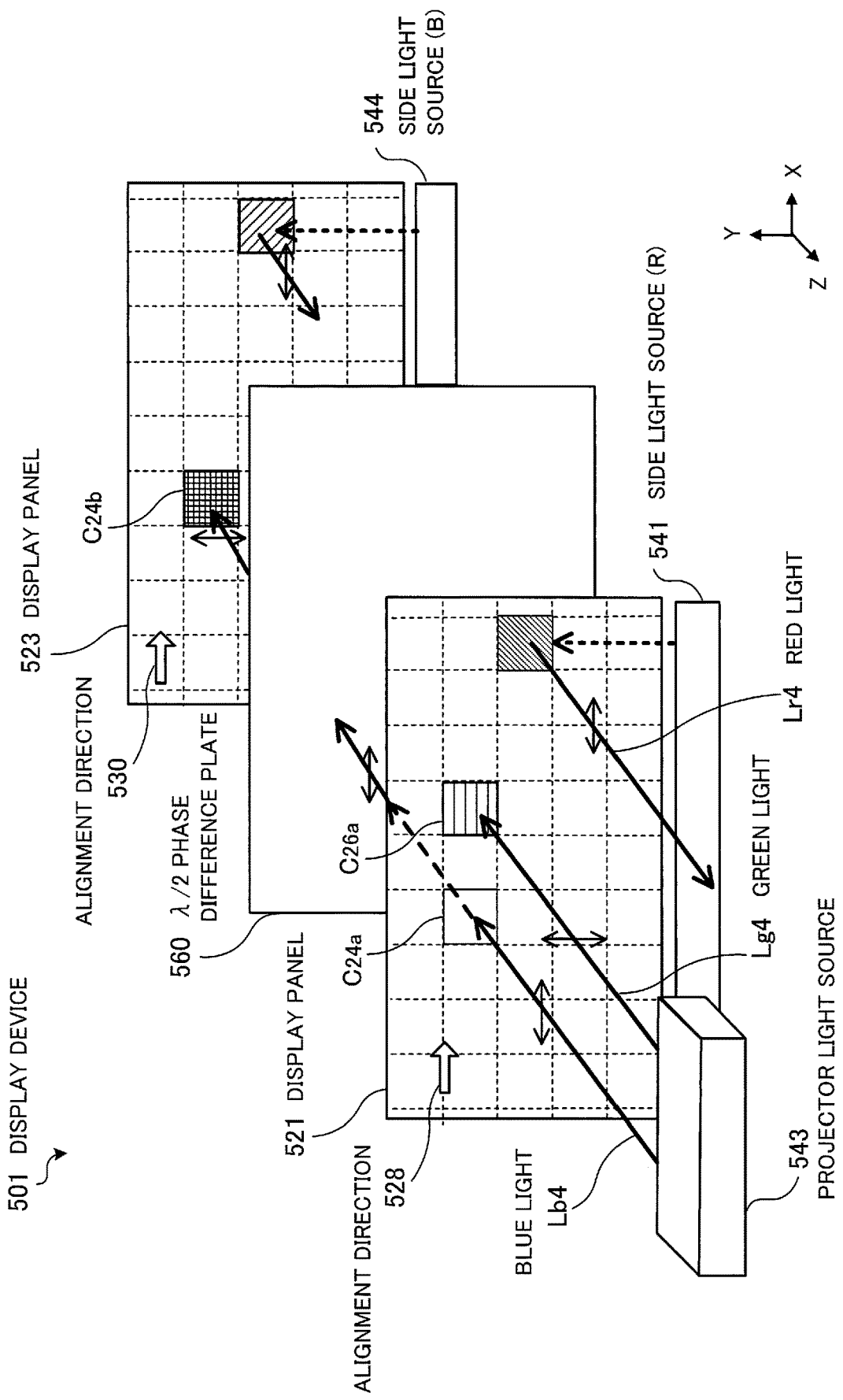
FIG. 23 illustrates a case where projector lights which differ in polarization direction enter in the structure illustrated in FIG. 22.

FIG. 23 illustrates a case where projector lights which differ in polarization direction enter in the structure illustrated in FIG. 22.

Blue light Lb4 is the same as the blue light Lb3 illustrated in FIG. 22. The blue light Lb4 emitted from a projector light source 543 passes through a display panel 521, its polarization plane is switched in λ/2 phase difference plate 560, and the blue light Lb4 is scattered in a display cell C24b of a display panel 523.

Unlike the green light Lg3 illustrated in FIG. 22, on the other hand, a polarization direction of green light Lg4 is perpendicular to an alignment direction 528 of the display panel 521. Accordingly, the green light Lg4 is scattered in a display cell C26a of the display panel 521.

As a result, the green light Lg4 emitted from the projector light source 543 is scattered in the target display cell Cpq of the display panel 521, red light Lr4 emitted from a side light source (R) 541 is scattered in a target display cell Cpq of the display panel 521, and the green light Lg4 and the red light Lr4 are visually recognized by an observer. Furthermore, the blue light Lb4 emitted from the projector light source 543 and blue light emitted from a side light source (B) 544 are scattered in target display cells Cpq of the display panel 523 and are visually recognized by the observer.

As has been described, by disposing between the display panels 521 and 523 a layer which switches a polarization plane of incident light, display switching is performed between the display panels 521 and 523.

The above structures are examples and the present disclosure is not limited to them. The number of stacked display panels, their alignment directions, the disposition of a layer which switches a polarization plane of incident light between display panels, a polarization direction of light emitted from a projector light source, and the like may be combined to perform desired display.

The above processing functions can be realized with a computer. In that case, a program in which the contents of the functions that the display device has are described is provided. By executing this program on the computer, the above processing functions are realized on the computer. This program may be recorded on a computer readable record medium. A computer readable record medium may be a magnetic storage device, an optical disk, a magneto-optical recording medium, a semiconductor memory, or the like. A magnetic storage device may be a hard disk drive (HDD), a flexible disk (FD), a magnetic tape, or the like. An optical disk may be a digital versatile disc (DVD), a DVD-RAM, a compact disc (CD)-ROM, a CD-recordable (R)/rewritable (RW), or the like. A magneto-optical recording medium may be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When a computer executes this program, it will store the program, which is recorded on a portable record medium or which is transferred from the server computer, in, for example, its storage unit. Then the computer reads the program from its storage unit and performs processes in compliance with the program. The computer may read the program directly from a portable record medium and perform processes in compliance with the program. Furthermore, each time the program is transferred from the server computer connected via a network, the computer may perform processes in order in compliance with the program it receives.

In addition, at least part of the above processing functions may be realized by an electronic circuit such as a digital signal processor (DSP), an application specific integrated circuit (ASIC), or a programmable logic device (PLD).

Various changes and modifications which fall within the scope of the concept of the present disclosure are conceivable by those skilled in the art and it is understood that these changes and modifications fall within the scope of the present disclosure. For example, those skilled in the art may add components to, delete components from, or make changes in the design of components in each of the above embodiments according to circumstances, or may add processes to, omit processes from, or make changes in conditions in processes in each of the above embodiments according to circumstances. These additions, deletions, changes, and omissions fall within the scope of the present disclosure as long as they include the essentials of the present disclosure.

The present disclosure includes the following aspects.

(1) A display device including: a light modulation layer disposed between a pair of transparent substrates, the light modulation layer having determined refractive index anisotropy and including plural light modulation elements, wherein the plural light modulation elements differ in responsiveness to an electric field generated by electrodes formed on a transparent substrate; and a light source which emits light of a determined color incident on the light modulation layer from a side of the light modulation layer, wherein: when the electric field is not generated, the light modulation layer transmits the incident light emitted from the light source; and when the electric field is generated, the light modulation layer scatters the incident light and emits scattered light to a transparent substrate.

(2) The display device according to (1), wherein: outer surfaces of the pair of transparent substrates on opposite sides of the light modulation layer are open; and when the electric field is not generated in the light modulation layer, the light modulation layer transmits the light which travels in a piercing direction, wherein the transparent substrate and the light modulation layer are pierced in the piercing direction, and wherein the light modulation layer transmits the light which enters the light modulation layer from one outer surface of the pair of transparent substrates, and emits the light to an outer side of the pair of transparent substrates.

(3) The display device according to (1), wherein: the electrodes generate the electric field in display units obtained by dividing a display area; the light source includes plural color light sources, wherein the plural color sources operate independently of one another, and the plural color sources emit lights of different colors to the display units; and the display device includes a drive section acquiring color information for the display area, lighting the color light sources corresponding to the color information, and according to the display units on the basis of the color information, synchronizing the lighting of the color light sources corresponding to the color information with applying voltage to the electrodes.

(4) The display device according to (3), wherein: the light source includes a first color light source which emits light of a first primary color, a second color light source which emits light of a second primary color, and a third color light source which emits light of a third primary color; and the drive section lights the first color light source and applies to the electrodes voltage corresponding to a first primary color component included in the color information, lights the second color light source and applies to the electrodes voltage corresponding to a second primary color component included in the color information, and lights the third color light source and applies to the electrodes voltage corresponding to a third primary color component included in the color information, for a period of one image display frame according to the display units.

(5) The display device according to (3), wherein, according to color components included in the color information, the drive section lights the color light sources corresponding to the color components to emit lights of the color components so that the lights enter a planar area of the light modulation layer, and sequentially applies the voltage to the electrodes in the display units.

(6) The display device according to (3), wherein, according to display unit groups each including the display units, wherein the display units are arranged in a direction in which light is emitted from the color light sources, the drive section lights the color light sources corresponding to color components to emit lights of the color components so that the lights enter areas of the light modulation layer corresponding to the display unit groups, and sequentially applies the voltage to the electrodes in the display units included in the display unit groups.

(7) The display device according to (6), wherein the drive section causes a color light source corresponding to a second display unit group adjacent to a first display unit group to be driven to emit light of a color which is the same as a color of light that enters the first display unit group, or turns off the color light source corresponding to the second display unit group.

(8) The display device according to (3), wherein: the electrodes include plural first electrodes each having a belt shape and extending in one direction in a plane of one of the pair of transparent substrates and plural second electrodes each having a belt shape and extending in a direction in a plane of the other of the pair of transparent substrates which intersects the direction in which the first electrodes extend; the display units are formed at portions at which the first electrodes and the second electrodes intersect; and the drive section controls simple matrix drive in which the first electrodes and the second electrodes are driven in order.

(9) The display device according to (1), including an incident light diffusion preventing section which is disposed between the light source and the light modulation layer for preventing light from diffusing in the light modulation layer, the light being emitted from the light source and entering the light modulation layer.

(10) The display device according to (1), including in-layer light diffusion preventing members on a transparent substrate, wherein the in-layer light diffusion preventing members prevent light from diffusing, the light being emitted from the light source and traveling in the light modulation layer, and wherein the in-layer light diffusion preventing members are formed in a direction in which the light travels.

(11) The display device according to (3), wherein: a first display panel and a second display panel each including the pair of transparent substrates, the light modulation layer, and the light source are stacked; and the drive section shifts a position of a first scanning line of the first display panel at which voltage is sequentially applied to electrodes to be driven and a position of a second scanning line of the second display panel at which voltage is sequentially applied to electrodes to be driven, and synchronizes and drives the first display panel and the second display panel.

(12) A display device including: a light modulation layer disposed between a pair of transparent substrates, the light modulation layer having determined refractive index anisotropy and including plural light modulation elements, wherein the light modulation elements differ in responsiveness to an electric field generated by electrodes formed on a transparent substrate; an external light source which emits light of a determined color incident on the light modulation layer from outside the transparent substrate; and a drive section acquiring color information for a display area, and synchronizing lighting of the external light source with applying of voltage to the electrodes on the basis of the color information; wherein: when the electric field is not generated, the light modulation layer transmits the incident light emitted from the external light source; and when the electric field is generated, the light modulation layer scatters the incident light and emits scattered light to a transparent substrate.

(13) The display device according to (12), including a light source which emits light of a determined color incident on the light modulation layer from a side of the light modulation layer, wherein the drive section synchronizes lighting of the external light source and the light source with applying of voltage to the electrodes on the basis of the color information.

(14) A display device including: a first display panel and a second display panel each including: a light modulation layer which is disposed between a pair of transparent substrates, the light modulation layer including a first light modulation element and second light modulation elements, wherein the first light modulation element and the second light modulation elements each have determined refractive index anisotropy, wherein responsiveness of the second light modulation elements to an electric field generated by electrodes formed on a transparent substrate is higher than responsiveness of the first light modulation element to the electric field, wherein tilt directions of the second light modulation elements responding to the electric field align, wherein the first display panel and the second display panel are stacked so that the tilt directions in the first display panel and the tilt directions in the second display panel are the same, and wherein, when the electric field is not generated, each of the first display panel and the second display panel transmits incident light, and when the electric field is generated, each of the first display panel and the second display panel transmits an incident light component whose polarization direction is the same as the tilt directions, and scatters incident light components whose polarization directions are different from the tilt directions, so that the polarized light polarized in a direction corresponding to the tilt directions is emitted to one of the transparent substrates.

(15) The display device according to (14), wherein the first display panel: includes a light source which emits light of a determined color incident on the light modulation layer from a side of the light modulation layer; and is disposed on a back side of the second display panel.

(16) The display device according to (14), including a phase difference plate which changes a polarization plane of the incident light, and, which is disposed between the first display panel and the second display panel.

(17) The display device according to (14), including: an external light source which emits polarized light polarized in a determined direction; and a drive section which synchronizes lighting of the external light source and lighting of the light source with applying of voltage to the electrodes on the basis of color information.

(18) The display device according to (17), including an element which rotates a polarization direction of light emitted from the external light source and which is disposed between the external light source and the light modulation layer.

(19) A display device including: a pair of transparent substrates disposed opposite to and apart from each other; and a light modulation layer which is disposed between the pair of transparent substrates, which includes a first light modulation element and second light modulation elements each having determined refractive index anisotropy, in which responsiveness of the second light modulation elements to an electric field generated by electrodes formed on a transparent substrate is higher than responsiveness of the first light modulation element to the electric field, and in which tilt directions of the second light modulation elements match at the time of the second light modulation elements responding to the electric field, wherein: when the electric field is not generated, the light modulation layer transmits incident light; when the electric field is generated, the light modulation layer transmits an incident light component whose polarization direction is the same as the tilt directions, scatters incident light components whose polarization directions are different from the tilt directions, and emits to a transparent substrate polarized light polarized in a direction corresponding to the tilt directions.

(20) The display device according to (1) to (19), wherein the light modulation layer includes liquid crystal molecules dispersed in polymeric material.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display panel including
a lower glass plate,
a lower electrode on the lower glass plate,
a first alignment film covering the lower electrode on the lower glass plate,
an upper glass plate,
an upper electrode on the upper glass plate,
a second alignment film covering the upper electrode on the upper glass plate, and
a light modulation layer including liquid crystalline polymers with a striped structure and liquid crystal molecules, the light modulation layer being disposed between the first alignment film and the second alignment film; and
a light source unit disposed at a side of the display panel and configured to emit incident light on the side of the display panel,
wherein
an alignment direction of the first alignment film is parallel to an alignment direction of the second alignment film,
an extending direction of the striped structure of the liquid crystalline polymers is parallel to the alignment direction of the first alignment film, and the light source unit includes a plurality of color light source groups having a red light source, a blue light source, and a green light source as one group, and the color light source groups are arranged in order along the extending direction of the striped structure of the liquid crystalline polymers.

2. The display device of claim 1, wherein when an electric field is not generated between the upper electrode and the lower electrode, the light modulation layer transmits the incident light emitted from the light source unit, and when the electric field is generated between the upper electrode and the lower electrode, the light modulation layer scatters the incident light outside the display panel.

3. The display device of claim 2, further comprising a lens disposed between the display panel and the light source unit.

4. The display device of claim 2, wherein the display panel further includes a panel drive circuit, and the light source unit further includes a light source drive circuit.

5. The display device of claim 4, further comprising a synchronous drive section connected to the panel drive circuit and the light source drive circuit, wherein the synchronous drive section acquires color information for the display panel, and lights color light sources included in the plurality of color light source groups corresponding to the color information, and the display device displays an image by field sequential control.

* * * * *